(12) United States Patent
Nakamura

(10) Patent No.: US 9,007,514 B2
(45) Date of Patent: Apr. 14, 2015

(54) FOCUS ADJUSTING APPARATUS AND METHOD

(75) Inventor: Shun Nakamura, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 13/327,583

(22) Filed: Dec. 15, 2011

(65) Prior Publication Data

US 2012/0162494 A1   Jun. 28, 2012

(30) Foreign Application Priority Data

Dec. 24, 2010   (JP) ................. 2010-288113

(51) Int. Cl.
- H04N 5/232 (2006.01)
- G03B 13/00 (2006.01)
- G02B 7/36 (2006.01)

(52) U.S. Cl.
CPC ............ G02B 7/365 (2013.01); H04N 5/23212 (2013.01)

(58) Field of Classification Search
None
See application file for complete search history.

(56) References Cited

U.S. PATENT DOCUMENTS

| | | | | |
|---|---|---|---|---|
| 6,166,770 | A * | 12/2000 | Yasuda | ........................ 348/350 |
| 8,243,191 | B2 * | 8/2012 | Uchida | ........................ 348/353 |
| 2003/0048372 | A1 | 3/2003 | Yasuda | |
| 2003/0202788 | A1 | 10/2003 | Watanabe et al. | |
| 2007/0116449 | A1 | 5/2007 | Takahashi et al. | |
| 2008/0055460 | A1 * | 3/2008 | Hsu | ........................ 348/345 |

FOREIGN PATENT DOCUMENTS

| | | |
|---|---|---|
| CN | 101271245 A | 9/2008 |
| CN | 101456298 A | 6/2009 |
| CN | 101806949 A | 8/2010 |
| JP | S63-253773 A | 10/1988 |
| JP | 7-298120 A | 11/1995 |
| JP | 2006-189634 A | 7/2006 |
| JP | 2009-205180 A | 9/2009 |
| JP | 2010-025985 A | 2/2010 |
| JP | 2010-250345 A | 11/2010 |
| WO | 2005/002212 A1 | 1/2005 |

* cited by examiner

*Primary Examiner* — Albert Cutler

(74) *Attorney, Agent, or Firm* — Canon USA Inc., IP Division

(57) ABSTRACT

A focus adjusting apparatus employable for an imaging system with an image-capturing unit configured to capture an image of an object, includes a unit configured to extract a specific frequency component from an image capturing signal along each horizontal scanning line to generate a focus signal and a unit configured to set a focus signal extraction area with reference to the image capturing signal. A peak holding unit extracts a line peak value by peak-holding the focus signal along each horizontal scanning line in the setting area. A first evaluation value generation unit generates an integral evaluation value by integrating line peak values obtained along a predetermined number of horizontal scanning lines of all the horizontal scanning lines in the setting area. A control unit performs a focus adjustment that includes driving a focus lens based on an AF evaluation value derived from the integral evaluation value.

7 Claims, 20 Drawing Sheets

POINT LIGHT SOURCE IN-FOCUS STATE

POINT LIGHT SOURCE OUT-OF-FOCUS STATE

INTEGRAL EVALUATION VALUE IN IN-FOCUS STATE
< INTEGRAL EVALUATION VALUE IN OUT-OF-FOCUS STATE

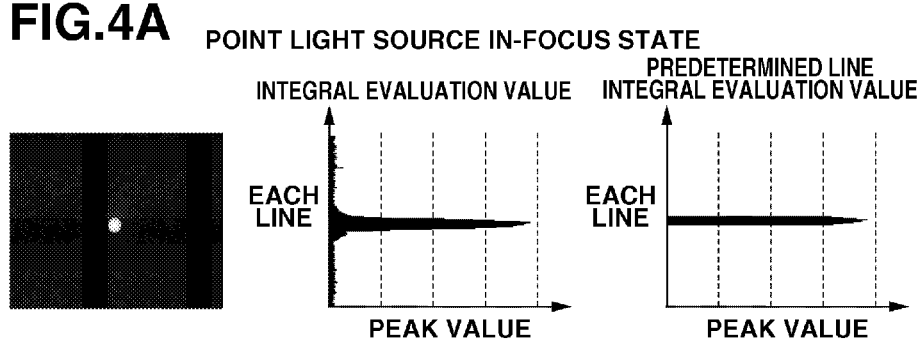

FIG.4A POINT LIGHT SOURCE IN-FOCUS STATE

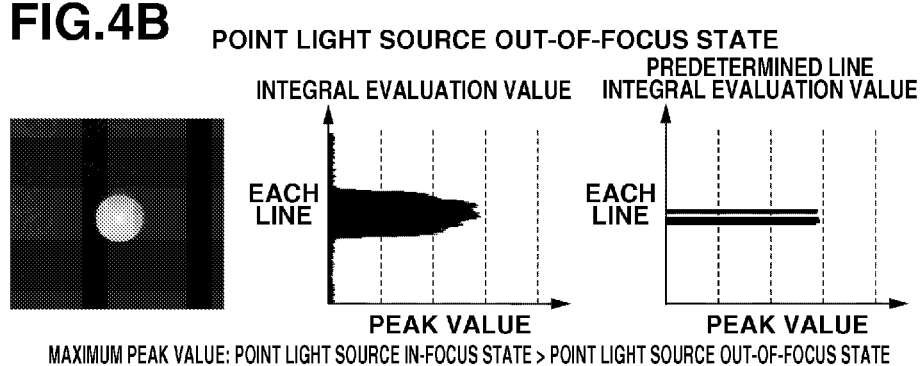

FIG.4B POINT LIGHT SOURCE OUT-OF-FOCUS STATE

MAXIMUM PEAK VALUE: POINT LIGHT SOURCE IN-FOCUS STATE > POINT LIGHT SOURCE OUT-OF-FOCUS STATE
ALL SCANNING LINE INTEGRAL EVALUATION VALUE:
POINT LIGHT SOURCE IN-FOCUS STATE < POINT LIGHT SOURCE OUT-OF-FOCUS STATE
PREDETERMINED SCANNING LINE INTEGRAL EVALUATION VALUE:
POINT LIGHT SOURCE IN-FOCUS STATE > POINT LIGHT SOURCE OUT-OF-FOCUS STATE

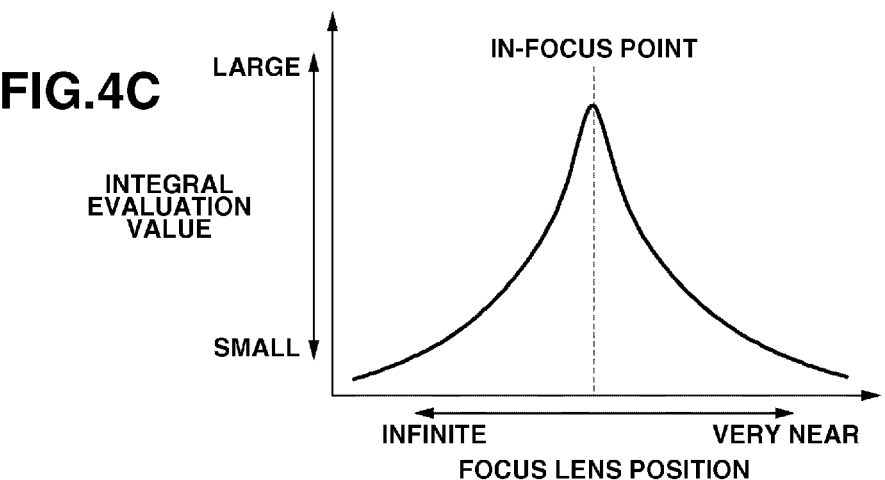

FIG.4C

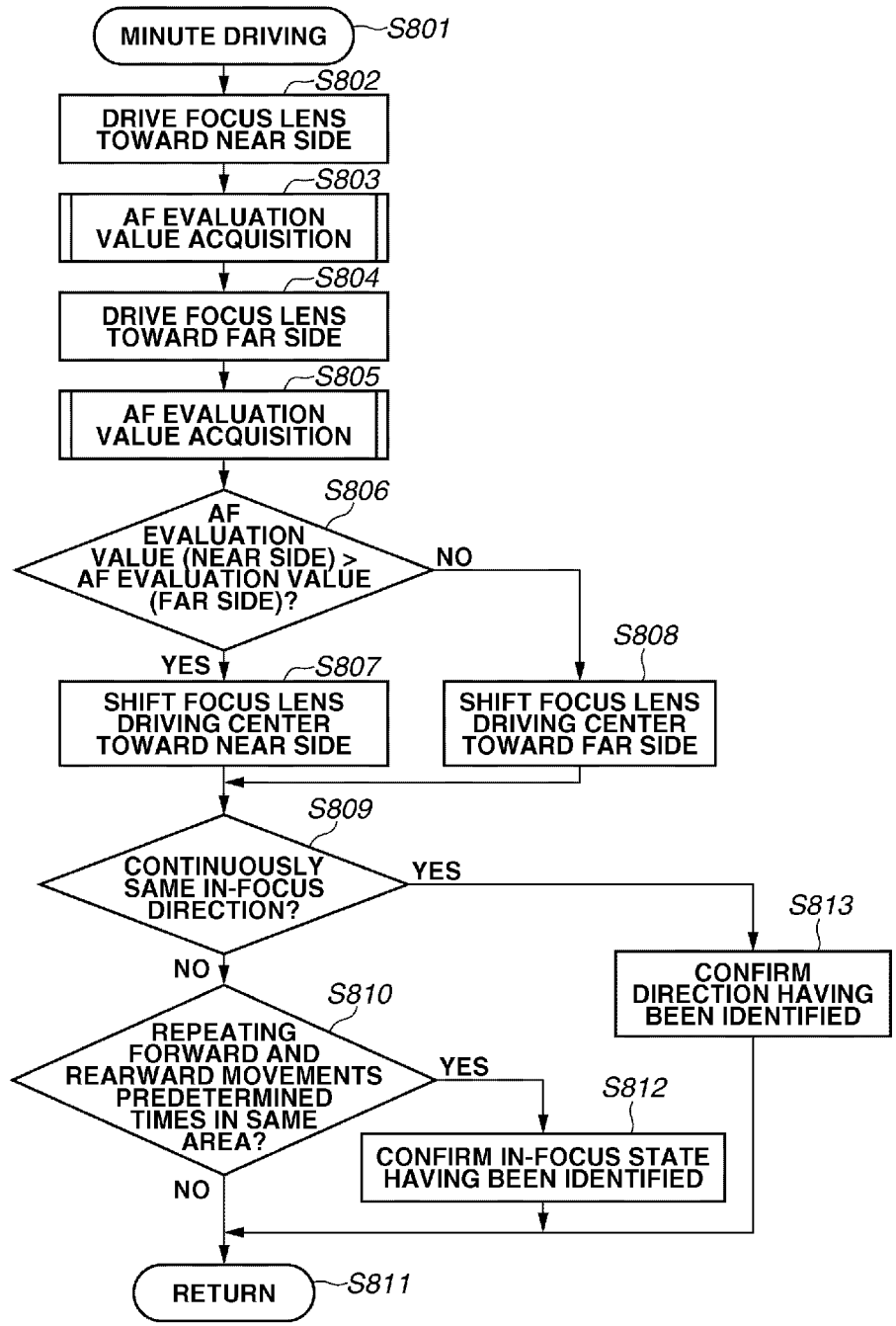

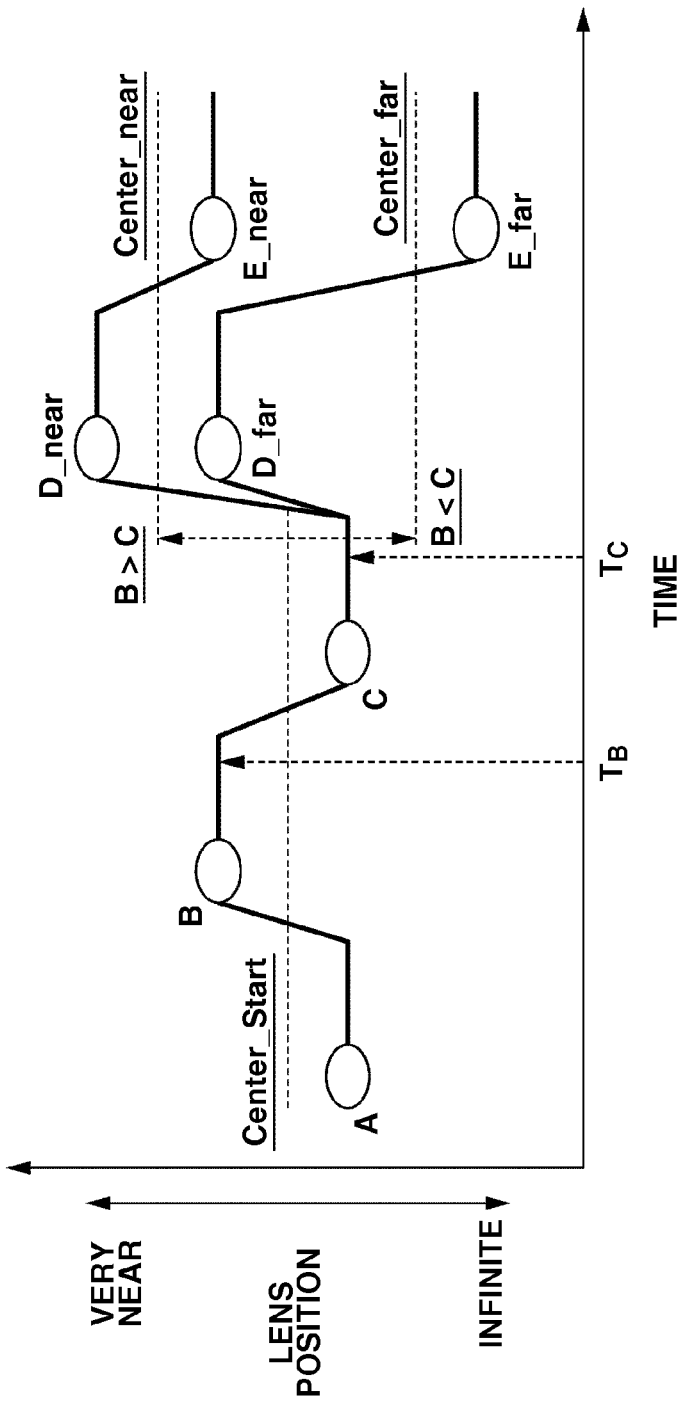

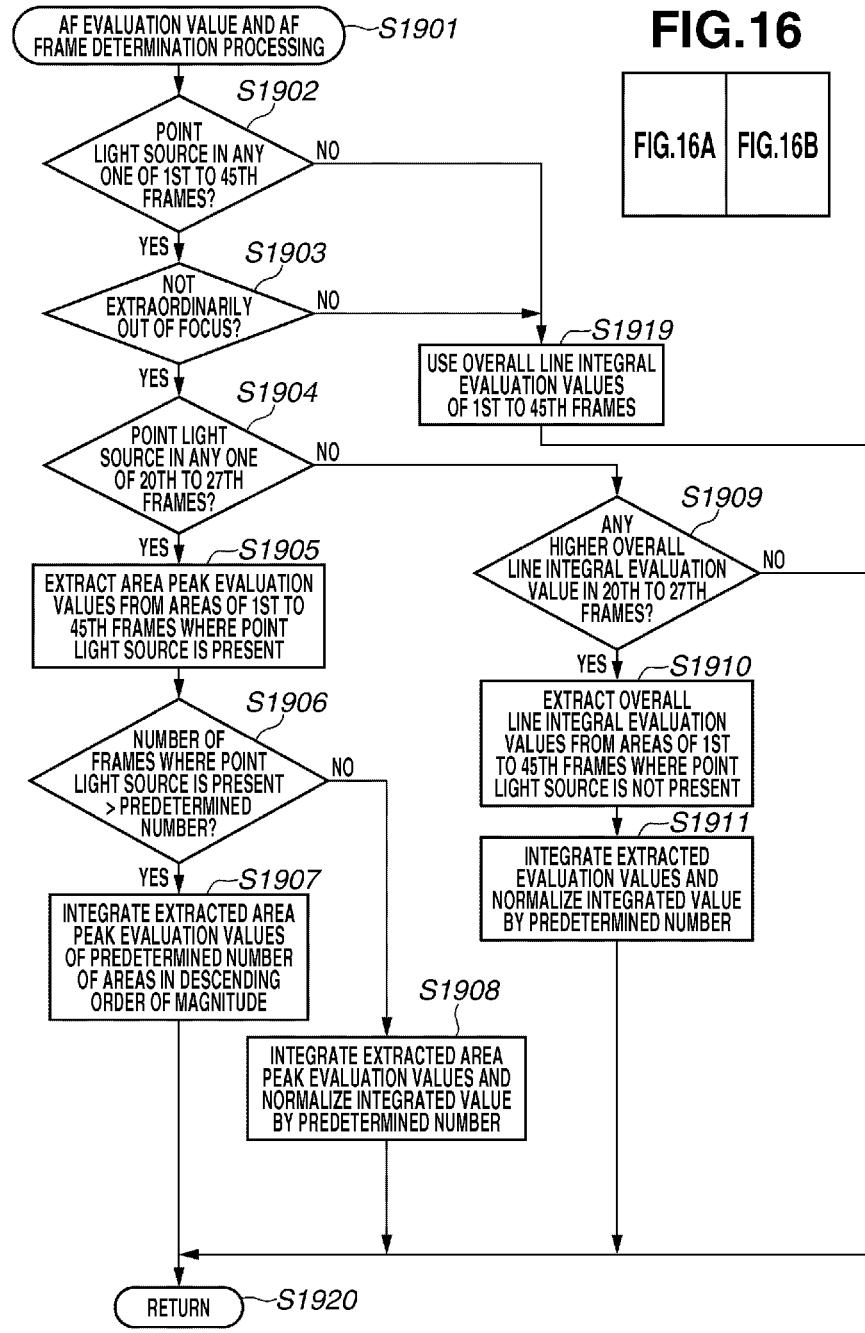

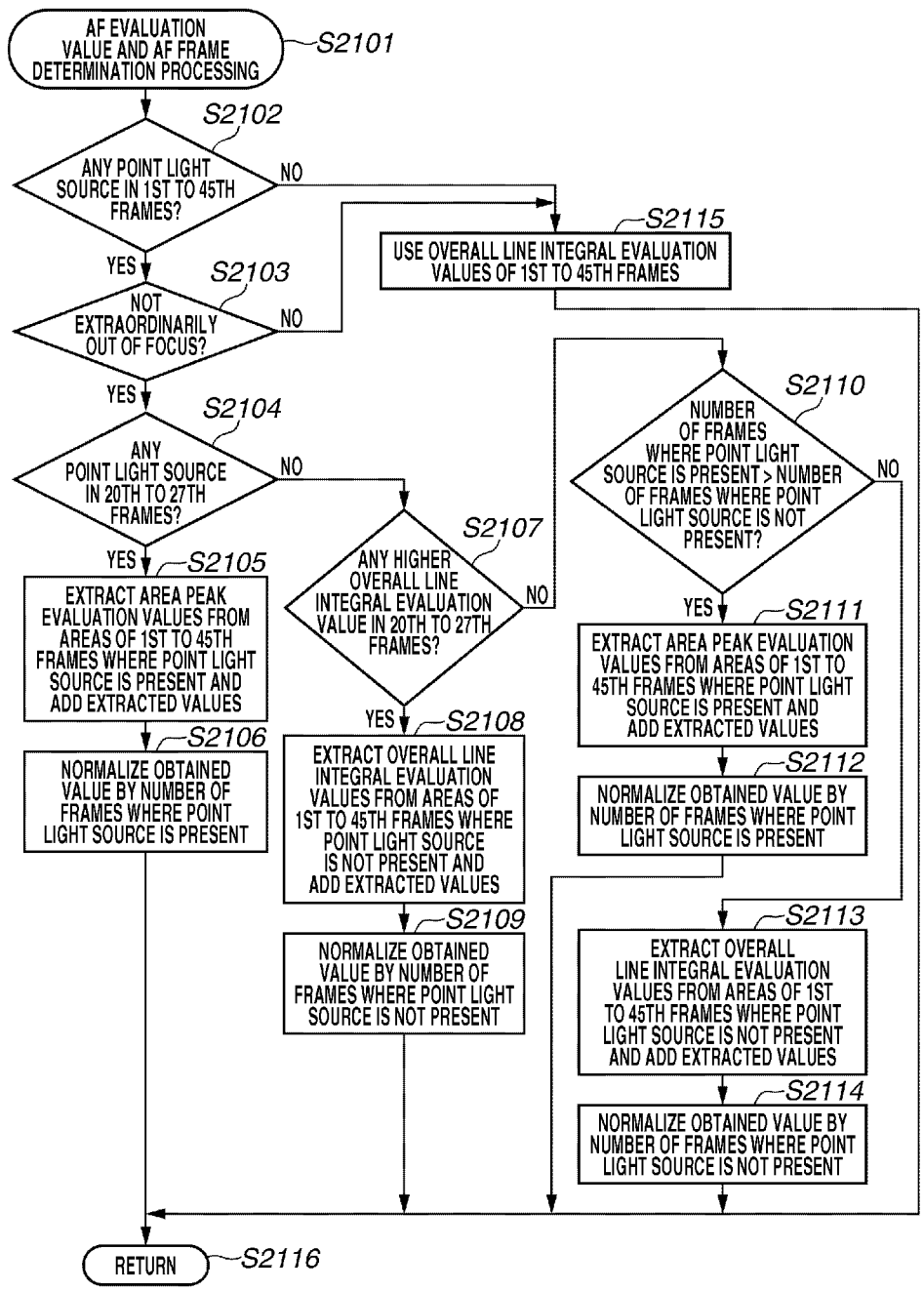

FOCUS ADJUSTING APPARATUS AND METHOD

BACKGROUND OF THE INVENTION

1. Field of the Invention

The present invention relates to a focus adjusting apparatus that can obtain a video signal that can be processed in an imaging system, such as a video camera, and relates to a focus adjusting method.

2. Description of the Related Art

An automatic focus adjustment (AF) apparatus can be employed for a video device, such as a video camera. For example, a conventionally known TV-AF system extracts a high frequency component, as a focus signal, from a video signal obtained by an image-capturing unit, such as a complementary metal oxide semiconductor (CMOS), and performs focus adjustment by driving a focus lens in such a way as to increase the magnitude of the focus signal. The magnitude of the focus signal can be expressed using an "AF evaluation value."

As discussed in Japanese Patent Application Laid-Open No. 7-298120, an AF evaluation value for the TV-AF system can be conventionally calculated as an integral evaluation value that is obtainable by integrating line peak values (obtained by peak-holding the focus signal along each horizontal line) in the vertical direction.

The integral evaluation value is stable and robust against instant noises due to effect of integration. Further, the integral evaluation value is excellent in sensitivity. Namely, the signal is sensitively variable in response to a very small focal shift. Thus, the integral evaluation value can be used to identify the in-focus direction.

Further, in the TV-AF system, there may be a problem that a point light source object cannot be focused. To solve the problem, as discussed in Japanese Patent Application Laid-Open No. 2006-189634, it is conventionally feasible to switch the integral evaluation value to be used in the control of the TV-AF system to a value obtainable by subtracting the present integral evaluation value from the maximum value of the integral evaluation value, in the vicinity of the in-focus point, if the presence of any point light source object is detected.

However, according to the integral evaluation value discussed in Japanese Patent Application Laid-Open No. 7-298120, a lens position corresponding to a large value may not coincide with the in-focus position in an image capturing operation of a point light source object. In general, if the target in a shooting operation is an ordinary object, the maximum point of the integral evaluation value coincides with the in-focus point as illustrated in FIG. 2.

On the other hand, if the target is a point light source object, the shooting operation is somewhat different. If the captured image of a point light source object is presently in focus as illustrated in FIG. 3A, the number of scanning horizontal lines available to capture the object is small although the focus signal has a very large line peak value. Therefore, the integral evaluation value does not increase so much.

However, if the captured image of a point light source object is presently out of focus as illustrated in FIG. 3B, the number of scanning horizontal lines available to capture the object is large although the focus signal has relatively smaller line peak values. Therefore, the integral evaluation value increases significantly.

From the reasons described above, the maximum point of the integral evaluation value does not coincide with the in-focus point as illustrated in FIG. 3C. Accordingly, if the system performs focus adjustment in such a way as to increase the integral evaluation value monotonously, an out-of-focus point may be erroneously detected as an in-focus point and a point light source object may not be focused adequately.

To solve the above-described problem, the technique discussed in Japanese Patent Application Laid-Open No. 2006-189634 is conventionally available. However, the conventional technique discussed in this patent literature is only useful to detect a minimum value that corresponds to the in-focus point illustrated in FIG. 3C. Therefore, the conventional technique requires a special control that is different from that of the TV-AF system, which identifies the maximum point of the integral evaluation value as the in-focus point.

Further, the minimum point (i.e., the in-focus point) may not clearly appear if shooting conditions for a target point light source object are inappropriate. In this case, it is difficult to focus on the target point light source object.

SUMMARY OF THE INVENTION

The focus adjusting apparatus according to the present invention generates a line peak value by peak-holding a focus signal for each horizontal scanning line in a focus signal extraction area, obtains an integral evaluation value by integrating the generated line peak values of a predetermined number of scanning lines, and uses the obtained value as an AF evaluation value for focus adjustment control.

Alternatively, the focus adjusting apparatus according to the present invention generates an area peak value by peak-holding the maximum value of a focus signal in an area having been set beforehand, obtains an integral evaluation value by adding or integrating the generated area peak values of a predetermined number of areas, and uses the obtained value as an AF evaluation value for focus adjustment control.

Thus, the present invention can obtain an AF evaluation value that is maximized at the in-focus point even in a shooting operation of a point light source object. Thus, the focus adjusting apparatus according to the present invention is appropriately applicable to the TV-AF system.

According to an aspect of the present invention, a focus adjusting apparatus for an imaging system includes an image-capturing unit configured to capture an image of an object via an optical system including a focus lens. The focus adjusting apparatus includes a generation unit configured to extract a specific frequency component from an image capturing signal generated by the image-capturing unit along each horizontal scanning line to generate a focus signal. The apparatus includes an area setting unit configured to set a focus signal extraction area with reference to the image capturing signal. The apparatus includes a peak holding unit configured to extract a line peak value by peak-holding the focus signal along each horizontal scanning line in the area set by the area setting unit. The apparatus includes a first evaluation value generation unit configured to generate an integral evaluation value by integrating line peak values obtained along a predetermined number of horizontal scanning lines of all the horizontal scanning lines in the area set by the area setting unit. The apparatus includes a control unit configured to perform a focus adjustment that includes driving the focus lens based on an AF evaluation value derived from the integral evaluation value generated by the first evaluation value generation unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B illustrate overall and predetermined line integral evaluation values in in-focus and out-of-focus states in a point light source shooting operation, and FIG. 4C illustrates a relationship between focus lens position and predetermined line integral evaluation value.

FIG. 6 is a flowchart illustrating a minute driving operation included in the AF processing according to the first exemplary embodiment of the present invention.

FIG. 7 illustrates an example lens movement in the minute driving operation in relation to elapsed time.

FIG. 18 is a flowchart illustrating AF evaluation value and AF frame determination processing according to a fourth exemplary embodiment of the present invention.

DESCRIPTION OF THE EMBODIMENTS

The focus adjusting apparatus according to the present invention generates a line peak value by peak-holding a focus signal for each horizontal scanning line from an area having been set beforehand, obtains an integral evaluation value by integrating the generated line peak values of a predetermined number of scanning lines, and uses the obtained value as an AF evaluation value for focus adjustment control.

Alternatively, the focus adjusting apparatus according to the present invention generates an area peak value by peak-holding the maximum value of a focus signal in an area having been set beforehand, obtains an integral evaluation value by adding or integrating the generated area peak values of a predetermined number of areas, and uses the obtained value as an AF evaluation value for focus adjustment control.

As a typical example, an integral evaluation value obtained based on integration using the above-described predetermined number of scanning lines can be directly used as an AF evaluation value. However, it is useful to perform any additional processing on the above-described integral evaluation value to generate an AF evaluation value.

Further, as a typical example, the AF evaluation value derived from the integral evaluation value obtained based on integration using the above-described predetermined number of scanning lines can be used to drive a focus lens in the focus adjustment control if it is determined that a point light source object is present in the above-described setting area.

However, even when the target is an object other than the point light source object, the AF evaluation value derived from the integral evaluation value obtained based on integration using the above-described predetermined number of scanning lines can be used for the focus adjustment control.

The integral evaluation value generated by the above-described third evaluation value generation unit can be directly used as the AF evaluation value or can be subjected to any additional processing to generate the AF evaluation value. As described below, the integral evaluation value can be generated according to an appropriate method considering various conditions of an object and can be used for focus adjustment control.

Various exemplary embodiments, features, and aspects of the invention will be described in detail below with reference to the drawings.

Figure 1:
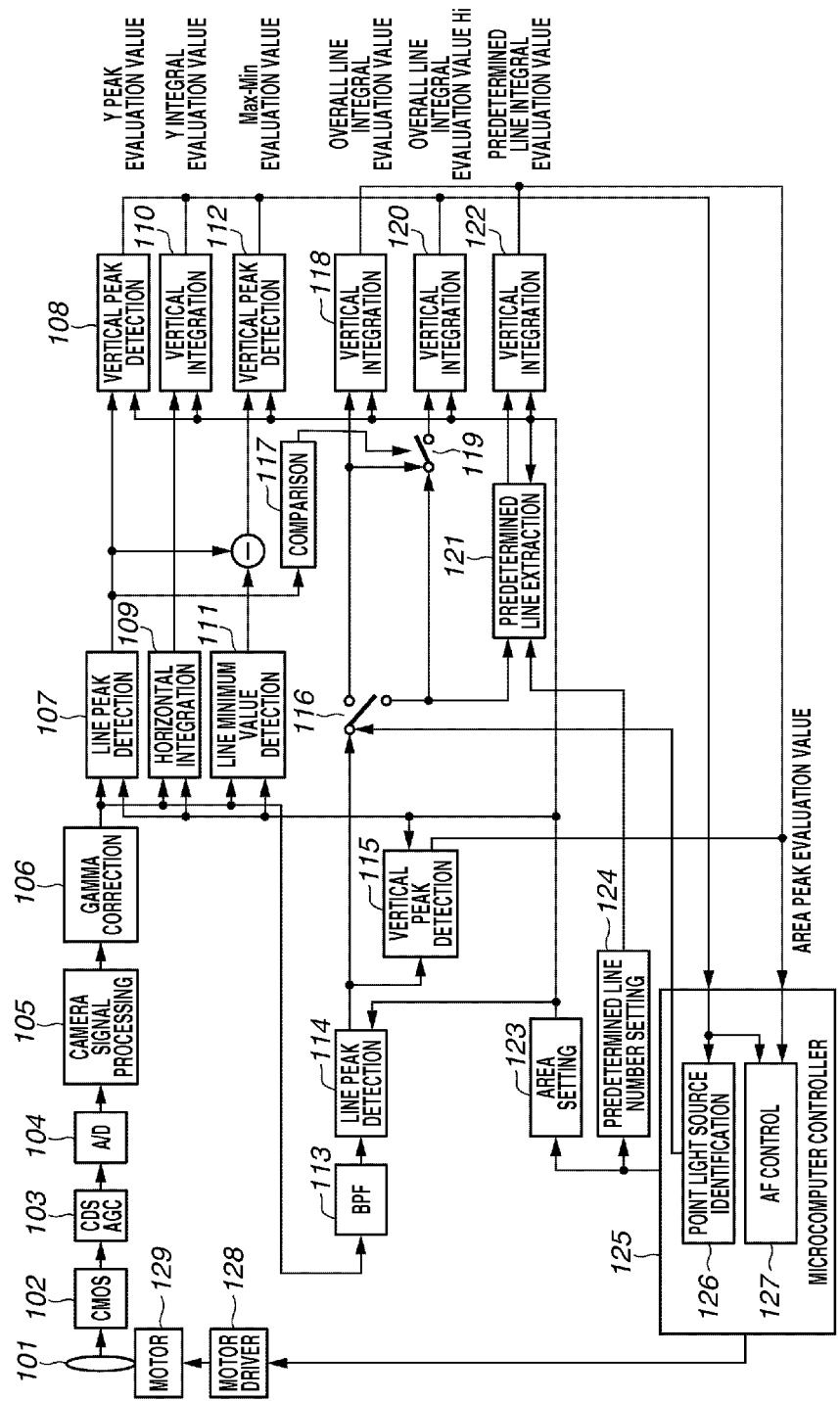
FIG. 1 is a block diagram illustrating an example configuration of a focus adjusting apparatus according to a first exemplary embodiment of the present invention.
Figure 2:
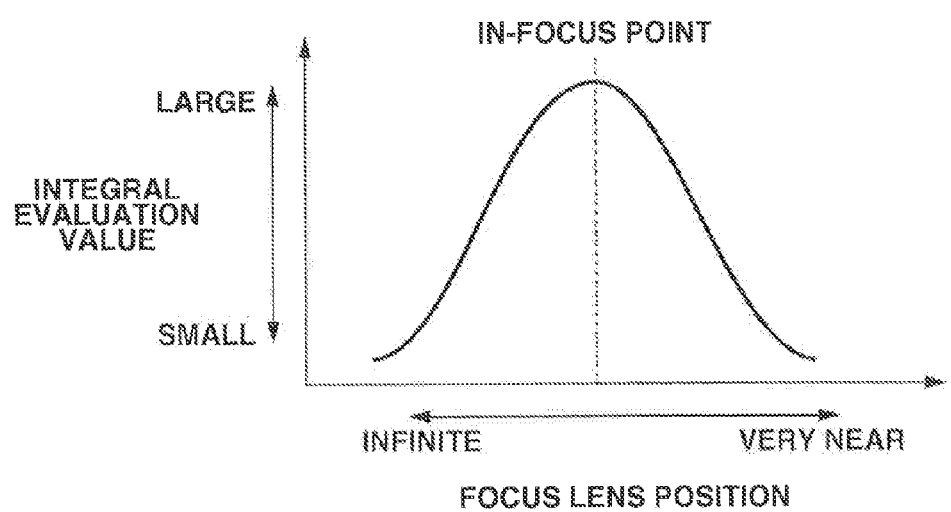
FIG. 2 is a graph illustrating a relationship between focus lens position and integral evaluation value in an object shooting operation.

FIG. 1 illustrates a configuration of an imaging system, such as a video camera, which includes a focus adjusting apparatus according to a first exemplary embodiment. The imaging system illustrated in FIG. 1 includes a focus lens 101 that constitutes a part of an optical system that receives light from an object. When the focus lens 101 moves in an optical axis direction, the focusing surface shifts correspondingly.

The light having passed through the lens 101 forms an image on an imaging plane of a complementary metal oxide semiconductor (CMOS) 102, which serves as an image-capturing unit. The CMOS 102 photo-electrically converts the received light into an electric signal. A correlated double sampling/automatic gain control (CDS/AGC) circuit 103 reads the photo-electrically converted signal and can sample and hold the read signal. Further, the CDS/AGC circuit 103 can output an amplified signal having an optimum gain.

An analog/digital (A/D) converter 104 converts the analog output signal of the CDS/AGC circuit 103 into a digital signal. A camera signal processing circuit 105 performs signal processing on the digital output signal of the A/D converter 104 to generate a television (TV) signal having a predetermined format.

The camera signal processing circuit 105 outputs a luminance signal Y that can be used to generate an AF evaluation value. A gamma correction circuit 106 performs gamma correction on the luminance signal Y received from the camera signal processing circuit 105 to emphasize a low-luminance component and suppress a high-luminance component.

Next, each evaluation value is described below. An area setting circuit 123 serves as an area setting unit configured to set an area from which a focus signal is extractable. The area set by the area setting circuit 123 is hereinafter referred to as an AF frame.

A line peak detection circuit 107 receives the gamma corrected luminance signal Y from the gamma correction circuit 106 and detects a line peak value of each horizontal line. The line peak detection circuit 107 obtains a Y line peak value of each horizontal line in the AF frame having been set by the area setting circuit 123.

Further, a vertical peak detection circuit 108 receives the output signal of the line peak detection circuit 107. The vertical peak detection circuit 108 can generate a Y peak evaluation value by peak-holding the signal along the vertical direction in the AF frame having been set by the area setting circuit 123. The Y peak evaluation value is effectively usable to identify a high-luminance object or a low-illuminance object.

A horizontal integration circuit 109 receives the gamma corrected luminance signal Y from the gamma correction circuit 106 to detect an integration value of each horizontal line. The horizontal integration circuit 109 can obtain a Y integration value of each horizontal line in the AF frame having been set by the area setting circuit 123.

Further, a vertical integration circuit 110 receives the output signal of the horizontal component circuit 109. The vertical integration circuit 110 performs integration processing along the vertical direction in the AF frame having been set by the area setting circuit 123 and generates a Y integral evaluation value. The generated Y integral evaluation value is usable to identify the entire brightness of the AF frame.

As described above, the gamma corrected luminance signal Y processed by the gamma correction circuit 106 is input to the line peak detection circuit 107. The line peak detection circuit 107 obtains the Y line peak value of each horizontal line in the AF frame.

A line minimum value detection circuit 111 receives the gamma corrected luminance signal Y from the gamma correction circuit 106. The line minimum value detection circuit 111 detects a minimum value of the luminance signal Y of each horizontal line in the AF frame.

A subtractor receives the Y line peak value of each horizontal line from the line peak detection circuit 107 and receives the minimum value of the luminance signal Y of each horizontal line, and generates an output signal representing a value "line peak value–minimum value." A vertical peak detection circuit 112 receives the output signal of the subtractor.

The vertical peak detection circuit 112 generates a Max-Min evaluation value by peak-holding the signal along the vertical direction in the AF frame. The Max-Min evaluation value is effectively usable to identify low-contrast or high-contrast.

A band pass filter (BPF) 113 receives the gamma corrected luminance signal Y having been processed by the gamma correction circuit 106 and extracts a specific frequency component to generate a focus signal. A line peak detection circuit 114 receives the focus signal from the BPF 113. The line peak detection circuit 114 serves as a peak holding unit configured to detect a line peak value of each horizontal line.

The line peak detection circuit 114 obtains the line peak value of each horizontal line in the AF frame. A vertical peak detection circuit 115 generates an area peak evaluation value by peak-holding the obtained line peak value in the AF frame. The generated area peak evaluation value does not vary greatly when a target object moves in the AF frame. Therefore, the area peak evaluation value is effectively usable for reactivation determination to transfer from an in-focus state to in-focus point searching processing.

The focus adjusting apparatus according to the present exemplary embodiment has the following characteristic features. A microcomputer controller 125 serves as a control unit and includes a point light source identification unit 126. The microcomputer controller 125 can control a selector switch 116 based on an output result of the point light source identification unit 126. To this end, the microcomputer controller 125 performs the following determinations.

The microcomputer controller 125 determines whether to input the line peak value generated by the line peak detection circuit 114 to a vertical integration circuit 118 (and to the selector switch 119) or to a predetermined line extraction circuit 121 (and to the selector switch 119). The vertical integration circuit 118 is functionally operable as a second evaluation value generation unit. The predetermined line extraction circuit 121 is functionally operable as a first evaluation value generation unit.

More specifically, the microcomputer controller 125 controls the selector switch 116 in such a way as to input the line peak value generated by the line peak detection circuit 114 to the predetermined line extraction circuit 121 only when the point light source identification unit 126 indentifies the presence of a point light source in the AF frame.

If the point light source identification unit 126 has not identified the presence of any point light source in the AF frame, the microcomputer controller 125 controls the selector switch 116 to input the line peak value to the vertical integration circuit 118. The vertical integration circuit 118 vertically integrates the line peak values of all the horizontal scanning lines in the AF frame and generates an overall line integral evaluation value resulting from the vertical integration. The generated overall line integral evaluation value has advantageous effects of integration (e.g., wide dynamic range and higher sensitivity) and is effectively usable as an AF main evaluation value in a focusing operation.

Further, the Y peak value of each horizontal line is input to a comparator 117 having a predetermined threshold set beforehand by the microcomputer controller 125. The comparator 117 controls the selector switch 119. Thus, only the peak value of each line having a Y peak value greater than the predetermined threshold is added to a vertical integration circuit 120. The vertical integration circuit 120 generates an overall line integral evaluation value Hi.

The microcomputer controller 125 compares the overall line integral evaluation value with the overall line integral evaluation value Hi, and determines whether a rate of high-luminance line components included in the integral evaluation value is greater than a rate of the remaining components based on the comparison result.

The focus adjusting apparatus according to the present exemplary embodiment has the following characteristic features.

When the point light source identification unit 126 determines that a point light source is present in the AF frame, the microcomputer controller 125 switches the selector switch 116 in such a way as to input the line peak value to the predetermined line extraction circuit 121 and the selector switch 119.

Figure 11:
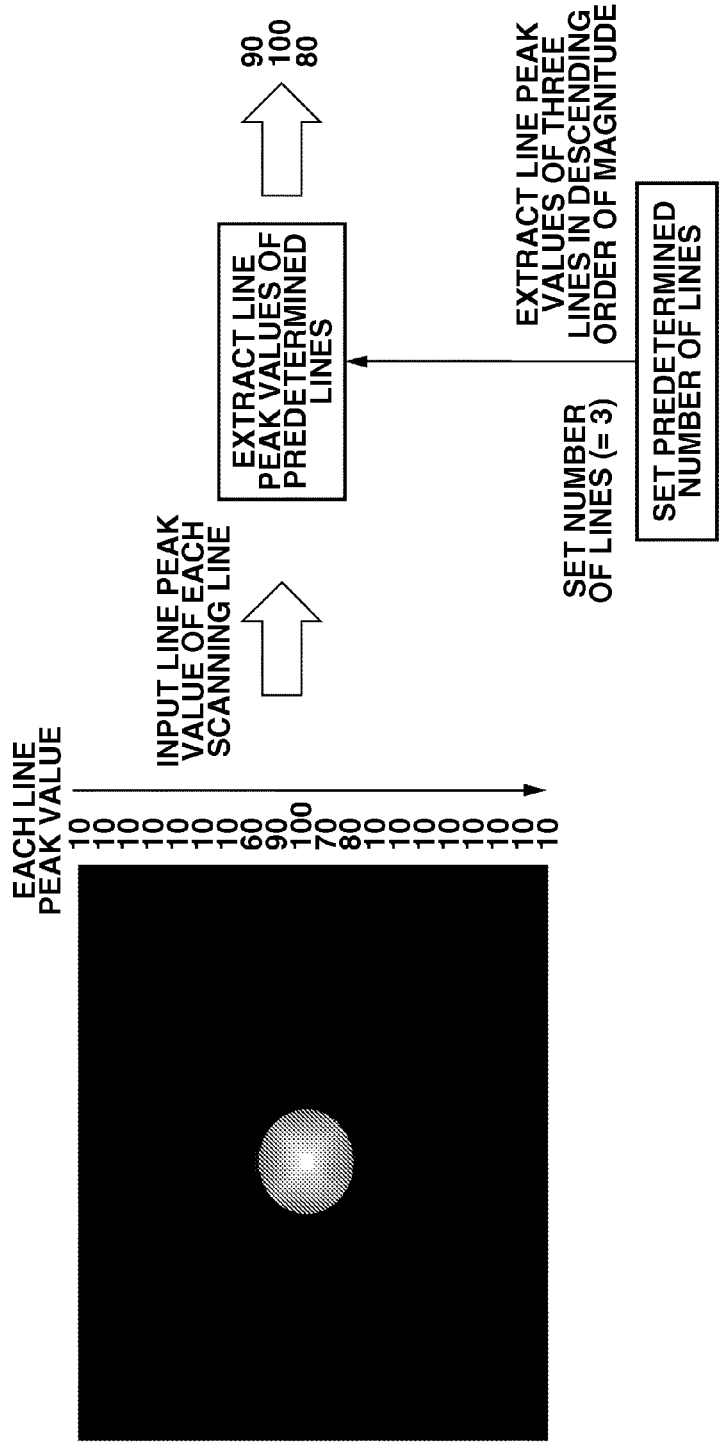
FIG. 11 illustrates an example extraction of line peak values from a predetermined number of scanning lines.

The predetermined line extraction circuit 121 extracts line peak values of a predetermined number of lines in descending order of magnitude, as illustrated in FIG. 11. The microcomputer controller 125 sets a "predetermined line number" for a predetermined line number setting circuit 124.

More specifically, the predetermined line extraction circuit 121 includes a buffer prepared beforehand to hold input line peak values in descending order of magnitude. The buffer holds received data by an amount corresponding to the number having been set by the predetermined line number setting circuit 124.

Then, the predetermined line extraction circuit 121 compares each input line peak value with the data stored in the buffer and leaves the input value if it is larger than any one of the stored values. Thus, the predetermined line extraction circuit 121 outputs the predetermined number of extracted line peak values to a vertical integration circuit 122. The vertical integration circuit 122 is functionally operable as the first evaluation value generation unit. The vertical integration circuit 122 integrates the received line peak values and generates a predetermined line integral evaluation value.

Further, as described above, the vertical integration circuit 120 generates the overall line integral evaluation value Hi based on the line peak values received via the selector switch 119. Further, as described above, the predetermined line number setting circuit 124 stores the "predetermined line number" having been set by the microcomputer controller 125. The predetermined line number setting circuit 124 sends the stored number to the predetermined line extraction circuit 121 to extract a designated number of line peak values.

Figure 3A:
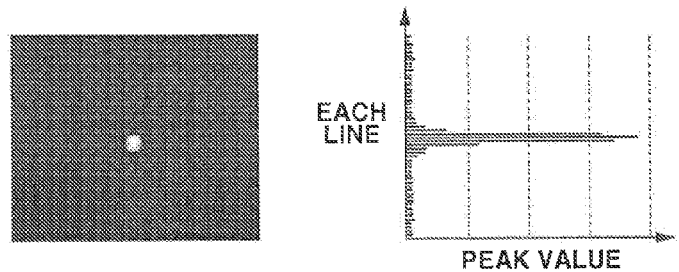
FIGS. 3A and 3B illustrate line peak values in in-focus and out-of-focus states in a point light source shooting operation.
Figure 3B:
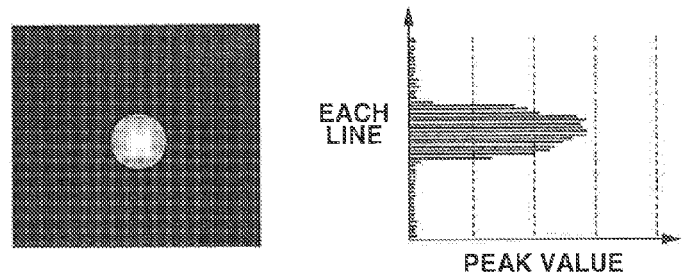

As described above with reference to FIGS. 3A to 3C, especially in FIG. 3C, the point where the integral evaluation value is maximized does not coincide with the in-focus point. The integral evaluation value is maximized at a slightly defocused point. Therefore, if the system performs focus adjustment in such a way as to increase the integral evaluation value, the point light source cannot be focused appropriately.

To solve the above-described problem, the system according to the present exemplary embodiment performs integration using a predetermined number of scanning lines, which is equal to or less than the number of scanning lines where the point light source object is present in in-focus state, as illustrated in FIG. 4. The system according to the present exemplary embodiment generates an integral evaluation value by integrating line peak values of the predetermined number of horizontal scanning lines in descending order of magnitude.

The operation to be performed by the system according to the present exemplary embodiment is based on the assumption that the line peak value is larger in in-focus state compared to that in out-of-focus although the overall line integral evaluation value becomes smaller in in-focus state compared to that in out-of-focus state. Therefore, if a limited number of large line peak values are integrated in descending order of magnitude, the integral evaluation value in in-focus state can be obtained as a significantly larger value.

The system according to the present exemplary embodiment extracts a predetermined number of line peak values in descending order of magnitude for the following reasons.

More specifically, it is feasible to accurately generate the integral evaluation value that takes a peak value at the in-focus position if the system selectively integrates only the line peak values of a limited number of scanning lines where the point light source is present or if the system selectively integrates line peak values of a specific point light source having a large edge component even in a case where a plurality of point light sources is present.

For example, if the system performs processing using scanning lines positioned in the vicinity of the maximum line peak value, the system may erroneously select a scanning line where the point light source is not present. Thus, the system may not be able to generate the integral evaluation value that takes a peak value at the in-focus position.

However, the method of integrating a predetermined number of line peak values is not limited to the above-described method. For example, the system can integrate a predetermined number of line peak values in descending order of magnitude together with the line peak values of neighboring scanning lines.

As described above, even in a point light source shooting operation, if the system generates an integral evaluation value by integrating line peak values of a predetermined number of scanning lines, the integral evaluation value is maximized at the in-focus position, as illustrated in FIG. 4C. More specifically, it is feasible to focus on a point light source object appropriately using the TV-AF system that performs focus adjustment in such a way as to increase the integral evaluation value.

If the "predetermined line number" to be set for the predetermined line number setting circuit 124 is excessively large, the integral evaluation value may not be maximized at the in-focus point. In other words, the system may fail in identifying the in-focus point. On the other hand, if the "predetermined line number" is excessively small, the integral evaluation value may include a large amount of noise component. In this case, the system may erroneously drive the focus lens in the wrong direction or AF control may become unstable.

Therefore, it is desired to set the "predetermined line number" to be equal to or less than a limit value at which the integral evaluation value can be maximized at the in-focus position. For example, a practical value of the "predetermined line number" is 10 lines, although it is variable depending on the size of a target point light source.

Further, in some cases, it may be desired that the predetermined line number setting circuit 124 changes the above-described "predetermined line number" with reference to shooting conditions. As a practical example, it is desired to change the "predetermined line number" according to the focal length. If the optical system performs a zoom operation in a shooting operation of a point light source object, the object image becomes smaller at a wide-angle side and larger at a telephoto side. More specifically, the number of scanning lines available to capture the point light source is small at the wide-angle side and large at the telephoto side.

Therefore, it is useful to decrease the "predetermined line number" at the wide-angle side so that the integral evaluation value can be maximized at the in-focus position. On the other hand, it is useful to increase the "predetermined line number" at the telephoto side so that the integral evaluation value having a smaller amount of noise component can be generated.

The area setting circuit 123 generates at least one AF frame gate signal corresponding to a predetermined position of the imaging screen having been set by the microcomputer controller 125. The area setting circuit 123 extracts only a focus signal that corresponds to an area of the AF frame.

The area setting circuit 123 sends the gate signal to each of the line peak detection circuits 107 and 114, the horizontal integration circuit 109, the line minimum value detection circuit 111, the vertical peak detection circuits 108, 112, and 115, the vertical integration circuits 110, 118, 120, and 122, and the predetermined line extraction circuit 121. More specifically, a timing signal is input to each circuit so that each AF evaluation value can be generated based on a Y signal in the AF frame.

To set a plurality of AF frames, it is required to obtain each AF evaluation value for each frame. Therefore, the following system configuration is employable. The number of data output buses to be prepared for each circuit to which the gate signal is initially input from the area setting circuit 123 (i.e., the line peak detection circuit 107, horizontal integration circuit 109, the line minimum value detection circuit 111, and the line peak detection circuit 114) is equal to the number of required AF frames.

The microcomputer controller 125 sets at least one AF frame gate corresponding to a predetermined position of the imaging screen for the area setting circuit 123. Further, the microcomputer controller 125 sets the "predetermined line number" for the predetermined line number setting circuit 124 to extract line peak values based on the set number.

Further, the microcomputer controller 125 includes the point light source identification unit 126 that determines the presence of a point light source object based on each AF evaluation value and controls the selector switch 116. Further, the microcomputer controller 125 includes an AF control unit 127 that controls a motor 129 via a motor driver 128 based on each input AF evaluation value. The motor 129 moves the focus lens 101 in the optical axis direction to perform AF control.

Next, an example AF control that can be performed by the microcomputer controller 125 is described in detail below with reference to FIG. 5 to FIG. 10. In the following description, the integral evaluation value and the predetermined line integral evaluation value are collectively referred to as AF evaluation values.

Figure 5:
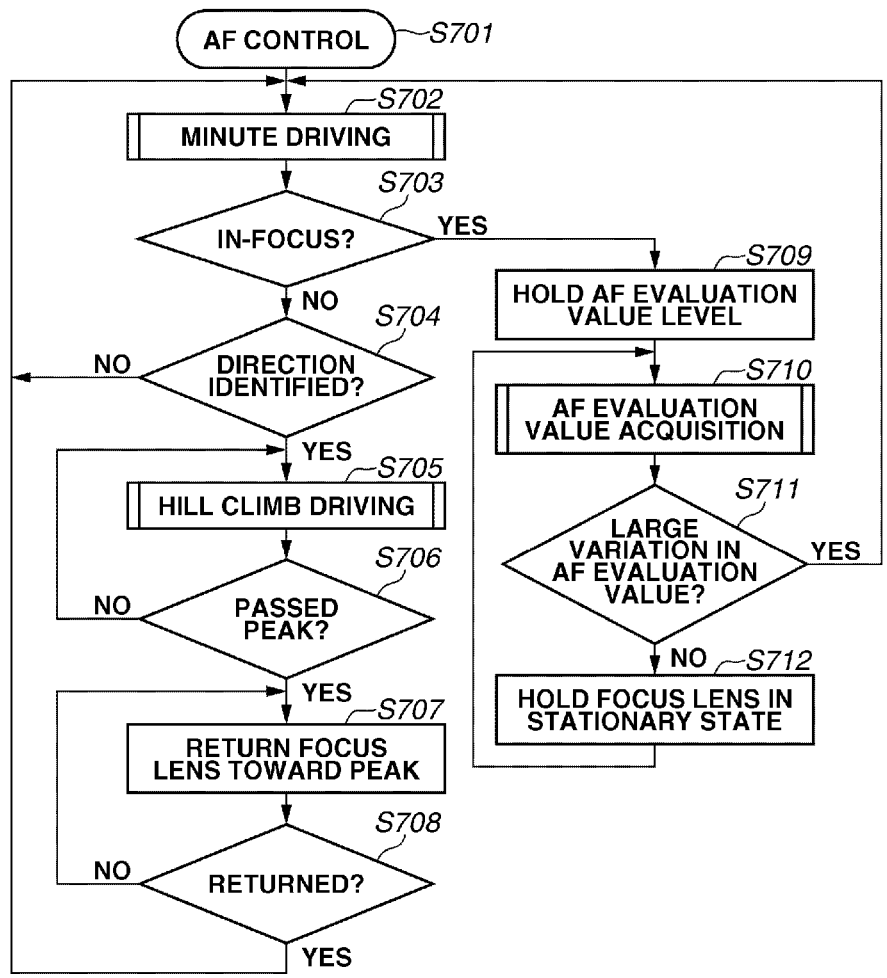
FIG. 5 is a flowchart illustrating main AF processing according to a first exemplary embodiment of the present invention.

FIG. 5 illustrates main AF processing that can be performed by the microcomputer controller 125. In step 701, the microcomputer controller 125 starts the AF control. In step 702, the microcomputer controller 125 performs a minute driving operation. The microcomputer controller 125 determines whether the presently captured image of an object is in focus state. If the captured image is out of focus, then the microcomputer controller 125 identifies the in-focus direction (i.e., the side on which the in-focus position is present). The minute driving operation is described in detail below.

If the microcomputer controller 125 determines that the captured image is in focus (Yes in step 703), then in step 709, the microcomputer controller 125 performs processing to be performed in in-focus state. If the microcomputer controller 125 determines that the presently captured image of the object is out of focus (No in step 703), the processing proceeds to step 704.

If the microcomputer controller 125 determines that the in-focus direction has been identified in step 702 (Yes in step 704), then in step 705, the microcomputer controller 125 performs a hill climb driving operation. If the microcomputer controller 125 determines that the in-focus direction has not been identified in step 702 (No in step 704), the processing returns to step 702 to continue the minute driving operation.

In step 705, the microcomputer controller 125 performs the hill climb driving operation for speedily moving the focus lens in a direction along which the AF evaluation value becomes larger. The hill climb driving operation that can be performed by the microcomputer controller 125 is described in detail below.

If the microcomputer controller 125 determines that the AF evaluation value has exceeded the peak in the hill climb driving operation performed in step 705 (Yes in step 706), the processing proceeds to step 707. If the microcomputer controller 125 determines that the AF evaluation value has not exceeded the peak (No in step 706), the processing returns to step 705 to continue the hill climb driving operation.

In step 707, the microcomputer controller 125 returns the focus lens to a peak lens position where the AF evaluation value has a maximum value during the hill climb driving operation. If the microcomputer controller 125 determines that the focus lens has reached the peak lens position (Yes in step 708), the processing returns to step 702 to perform the minute driving operation again.

If the microcomputer controller 125 determines that the focus lens has not reached the peak lens position (No in step 708), the processing returns to step 707 and continues the operation for returning the focus lens to the peak lens position.

Next, reactivation determination processing to be performed in the in-focus state (i.e., the processing starting with step 709) is described below. In step 709, the microcomputer controller 125 holds the AF evaluation values. In step 710, the microcomputer controller 125 acquires latest AF evaluation values.

In step 711, the microcomputer controller 125 compares the AF evaluation values held in step 709 with the AF evaluation values newly acquired in step 710. If the different is equal to or greater than a predetermined level (Yes in step 711), the microcomputer controller 125 determines the necessity of reactivation. The processing returns to step 702 to restart the minute driving operation.

If the necessity of reactivation is not confirmed (No in step 711), the processing proceeds to step 712. In step 712, the microcomputer controller 125 holds the focus lens in a stationary manner. The processing returns to step 710 to continue the reactivation determination processing.

Next, the minute driving operation is described in detail below with reference to FIG. 6. In step 801, the microcomputer controller 125 starts the processing to be performed in step 702. In step 802, the microcomputer controller 125 drives the focus lens toward the near side.

Then, in step 803, the microcomputer controller 125 acquires each latest AF evaluation value at the spot where the microcomputer controller 125 has moved the focus lens toward the near side in step 802.

Further, in step 804, the microcomputer controller 125 drives the focus lens toward the far side (i.e., the direction opposite to the direction in step 802). Then, in step 805, the microcomputer controller 125 acquires each latest AF evaluation value at the spot where the microcomputer controller 125 has moved the focus lens toward the far side in step 804.

In step 806, the microcomputer controller 125 compares the AF evaluation value (at the near side) acquired in step 803 with the AF evaluation value (at the far side) acquired in step 805.

If the microcomputer controller 125 determines that the AF evaluation value acquired at the near side is larger than the AF evaluation value acquired at the far side (Yes in step 806), the processing proceeds to step 807. If the microcomputer controller 125 determines that the AF evaluation value acquired at the far side is larger than the AF evaluation value acquired at the near side (No in step 806), the processing proceeds to step 808.

In step 807, the microcomputer controller 125 shifts the center position of the focus lens driving operation toward the near side, because the AF evaluation value is higher at the near side and the in-focus position is presumed to be present in the near side. Then, the processing proceeds to step 809. On the other hand, in step 808, the microcomputer controller 125 shifts the center position of the focus lens driving operation toward the far side, because the AF evaluation value is higher at the far side and the in-focus position is presumed to be present in the far side. Then, the processing proceeds to step 809.

If the microcomputer controller 125 determines that the in-focus direction remains the same predetermined times continuously (Yes in step 809), the processing proceeds to step 813. If the microcomputer controller 125 determines that the in-focus direction does not remain the same predetermined times continuously (No in step 809), the processing proceeds to step 810.

If the microcomputer controller 125 determines that the focus lens is repeating forward and rearward movements predetermined times in a predetermined range (Yes in step 810), the processing proceeds to step 812. If the microcomputer controller 125 determines that the focus lens is not continuously present in the predetermined range for a predetermined time (No in step 810), then in step 811, the microcomputer controller 125 terminates the processing of the flowchart illustrated in FIG. 6. In this case, the processing returns to step 802 to perform the minute driving operation again.

In step 813, the microcomputer controller 125 confirms that the direction has been identified. Then, in step 811, the microcomputer controller 125 terminates the minute driving operation. In this case, the processing transfers to the hill climb driving operation (see step 705 in FIG. 5). In step 812, the microcomputer controller 125 confirms that the in-focus state has been identified. Then, in step 811, the microcomputer controller 125 terminates the minute driving operation. In this case, the processing transfers to the reactivation determination routine (see steps 709 to 711 in FIG. 5).

FIG. 7 illustrates the above-described lens driving operation in relation to elapsed time. In the initial state, the focus lens stays at a position A. First, the microcomputer controller 125 drives the focus lens toward the nearside until the focus lens reaches a position B. The microcomputer controller 125 acquires an evaluation value B that corresponds to electric charge stored in the CMOS at time $T_B$.

Next, the microcomputer controller 125 drives the focus lens toward the far side until the focus lens reaches a position C. The microcomputer controller 125 acquires an evaluation value C that corresponds to electric charge stored in the CMOS at time $T_C$. The evaluation values B and C are AF evaluation values that can be obtained when the focus lens has moved from a central position "Center_Start" to the near side and the far side, respectively, by the same amount.

Further, the microcomputer controller 125 compares the evaluation value B with the evaluation value C at the time $T_C$. If a relationship B>C is confirmed, the microcomputer controller 125 shifts the central position of the focus lens driving operation from the "Center_Start" to a "Center_near."

Thus, the focus lens starts moving in a range defined by a position "D_near" on the near side of the "Center_near" and a position "E_near" on the far side of the "Center_near." Then, the microcomputer controller 125 shifts the central position of the focus lens driving operation again based on a comparison between AF evaluation values of the "D_near" and "E_near" positions.

On the other hand, if a relationship B<C is confirmed, the microcomputer controller 125 shifts the central position of the focus lens driving operation from the "Center_Start" to a "Center_far." Thus, the focus lens starts moving in a range defined by a position "D_far" on the near side of the "Center_far" and a position "E_far" on the far side of the "Center_far." Then, the microcomputer controller 125 shifts the central position of the focus lens driving operation again based on a comparison between AF evaluation values of the "D_far" and "E_far" positions.

In the present exemplary embodiment, the microcomputer controller 125 determines the driving amount of the lens based on the depth of focus to be an appropriate value in such a manner that the movement pitch of the focus lens cannot be visually recognized on a TV screen that performs display based on an image capturing signal.

Next, an example of the hill climb driving operation is described below with reference to FIG. 8A. In step 1001, the microcomputer controller 125 starts the processing to be performed in step 705. In step 1002, the microcomputer controller 125 acquires each latest AF evaluation value. If the microcomputer controller 125 determines that the AF evaluation value acquired in step 1002 is greater than the previously acquired AF evaluation value (Yes in step 1003), the processing proceeds to step 1004. If the microcomputer controller 125 determines that the acquired AF evaluation value is equal to or smaller than the previously acquired AF evaluation value (No in step 1003), the processing proceeds to step 1006.

In step 1004, the microcomputer controller 125 drives the focus lens in a direction similar to the previous direction at a predetermined speed. In step 1005, the microcomputer controller 125 terminates the processing of the flowchart illustrated in FIG. 8A. The processing proceeds to step 706 illustrated in FIG. 5.

If the microcomputer controller 125 determines that the AF evaluation value is not in a decreasing phase beyond the peak (No in step 1006), the processing proceeds to step 1007. If the microcomputer controller 125 determines that the AF evaluation value is in the decreasing phase beyond the peak (Yes in step 1006), the processing proceeds to step 1008.

Figure 8A:
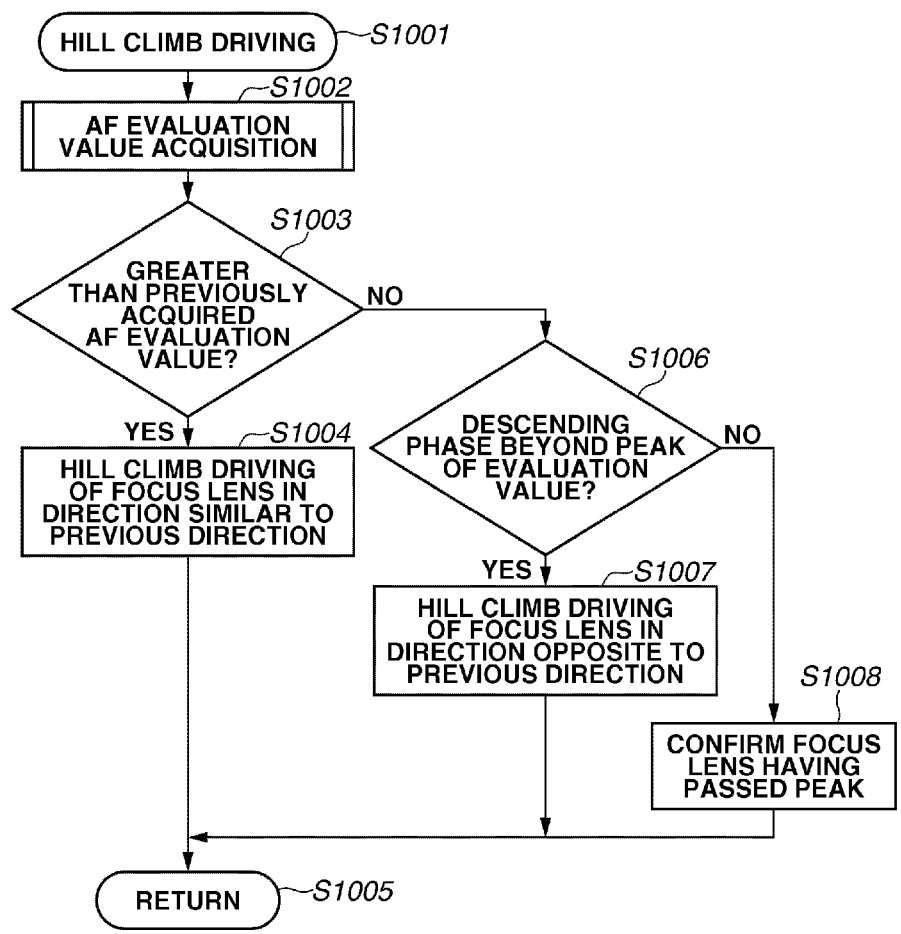
FIG. 8A is a flowchart illustrating a hill climb driving operation included in the AF processing according to the first exemplary embodiment of the present invention.

In step 1008, the microcomputer controller 125 confirms that the AF evaluation value has passed the peak and terminates the processing of the flowchart illustrated in FIG. 8A. In step 1007, the microcomputer controller 125 drives the focus lens in a direction opposite to the previous direction at a predetermined speed and terminates the processing of the flowchart illustrated in FIG. 8A. The processing proceeds to step 706 illustrated in FIG. 5.

Figure 8B:
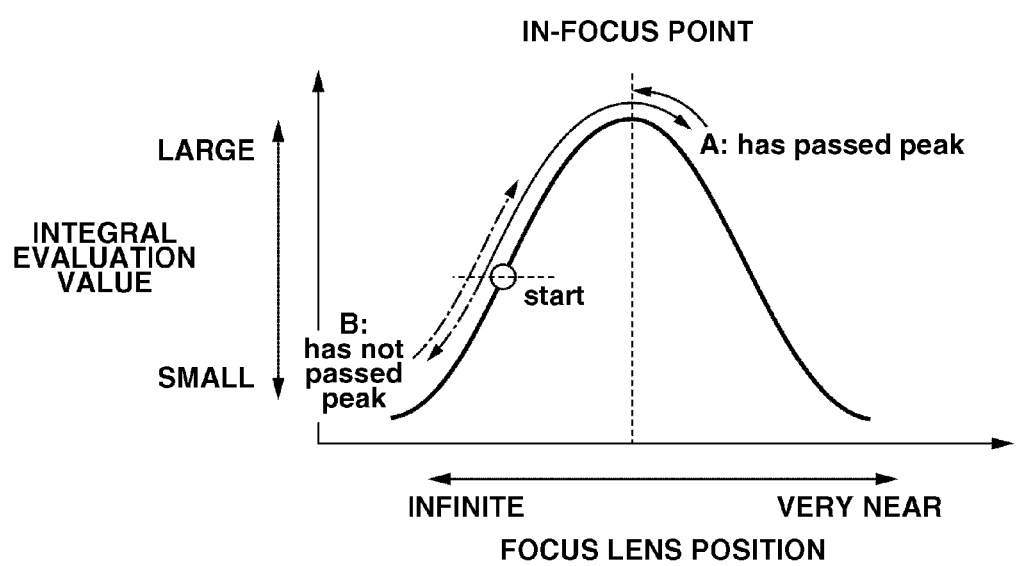
FIG. 8B illustrates an example hill climb driving operation included in the AF processing.

FIG. 8B illustrates the lens driving operation described with reference to the flowchart illustrated in FIG. 8A. It is presumed that the microcomputer controller 125 starts the hill climb driving operation at a "start" point illustrated in FIG. 8B. First, the microcomputer controller 125 drives the focus lens along a solid line that connects the "start" point to a spot A. In this case, the spot A is in a descending phase beyond the peak in the hill climb driving operation.

Thus, the microcomputer controller 125 determines that the focus lens has already passed the peak and stops the focus lens. Then, the microcomputer controller 125 returns the focus lens toward the peak lens position and transfers to the minute driving operation when the focus lens comes in the vicinity of the peak.

On the other hand, the microcomputer controller 125 drives the focus lens along an alternate long and short dash line that connects the "start" point to a spot B. In this case, the spot B is in a descending phase departing from the peak in the hill climb driving operation. Thus, the microcomputer controller 125 determines that the direction is wrong and restarts the hill climbing operation in the opposite direction. A moving amount per predetermined time in the hill climbing operation is larger than that in the minute driving operation.

Next, the AF evaluation value acquisition processing to be performed in step 710 illustrated in FIG. 5, steps 803 and 805 illustrated in FIG. 6, and step 1002 illustrated in FIG. 8 is described below with reference to FIG. 9.

In step 1201, the microcomputer controller 125 starts the AF evaluation value acquisition processing. In step 1202, the microcomputer controller 125 checks the operational state of the selector switch 116 illustrated in FIG. 1. If the selector switch 116 is in the state to acquire the predetermined line integral evaluation value (Yes in step 1202), the processing proceeds to step 1203.

If the selector switch 116 is not in the state to acquire the predetermined line integral evaluation value (No in step 1202), the processing proceeds to step 1204. In step 1203, the microcomputer controller 125 acquires various AF evaluation values including the predetermined line integral evaluation value (i.e., all the generated AF evaluation values but the overall line integral evaluation value).

In step 1204, the microcomputer controller 125 acquires various AF evaluation values including the overall line integral evaluation value (i.e., all the generated AF evaluation values but the predetermined line integral evaluation value). In step 1205, the microcomputer controller 125 causes the point light source identification unit 126 illustrated in FIG. 1 to perform point light source identification processing.

If the microcomputer controller 125 determines that a point light source is present (Yes in step 1206), the processing proceeds to step 1207. If the microcomputer controller 125 determines that there is not any point light source (No in step 1206), the processing proceeds to step 1209.

In step 1207, the microcomputer controller 125 checks the present focus state. If the microcomputer controller 125 determines that the presently captured image of the object is not extraordinarily out of focus (Yes in step 1207), the processing proceeds to step 1208. If the microcomputer controller 125 determines that the captured image is extraordinarily out of focus (No in step 1207), the processing proceeds to step 1209.

In step 1208, the microcomputer controller 125 brings the system into a state where an integral evaluation value of predetermined scanning lines can be generated, because the presence of the point light source is confirmed and the necessity of using the predetermined line integral evaluation value is determined. To this end, the microcomputer controller 125 controls the selector switch 116 illustrated in FIG. 1 to select the predetermined line extraction circuit 121 illustrated in FIG. 1. Then, in step 1210, the microcomputer controller 125 terminates the AF evaluation value acquisition processing.

On the other hand, in step 1209, the microcomputer controller 125 brings the system into a state where an integral evaluation value of all scanning lines can be generated, because there is not any point light source and it is not required to use the predetermined line integral evaluation value. To this end, the microcomputer controller 125 controls the selector switch 116 illustrated in FIG. 1 to disconnect the predetermined line extraction circuit 121 illustrated in FIG. 1. Then, in step 1210, the microcomputer controller 125 terminates the AF evaluation value acquisition processing.

As described above, the microcomputer controller 125 checks the presence of a point light source and, if there is not any point light source, uses the overall line integral evaluation value that is excellent in sensitivity and small in noise. If a point light source is present, the microcomputer controller 125 uses the predetermined line integral evaluation value to drive the focus lens to focus on the point light source in the TV-AF system.

Further, if the presently captured image of the object is extraordinarily out of focus, the microcomputer controller 125 uses the overall line integral evaluation value (i.e., a stable and low-noise signal) because there is not any problem relating to the point light source such that the AF evaluation value decreases in the vicinity of the in-focus point. Thus, the microcomputer controller 125 can drive the focus lens appropriately in a case where a point light source object is included in a scene or even in a case where there is not any point light source object in a scene.

Figure 9:
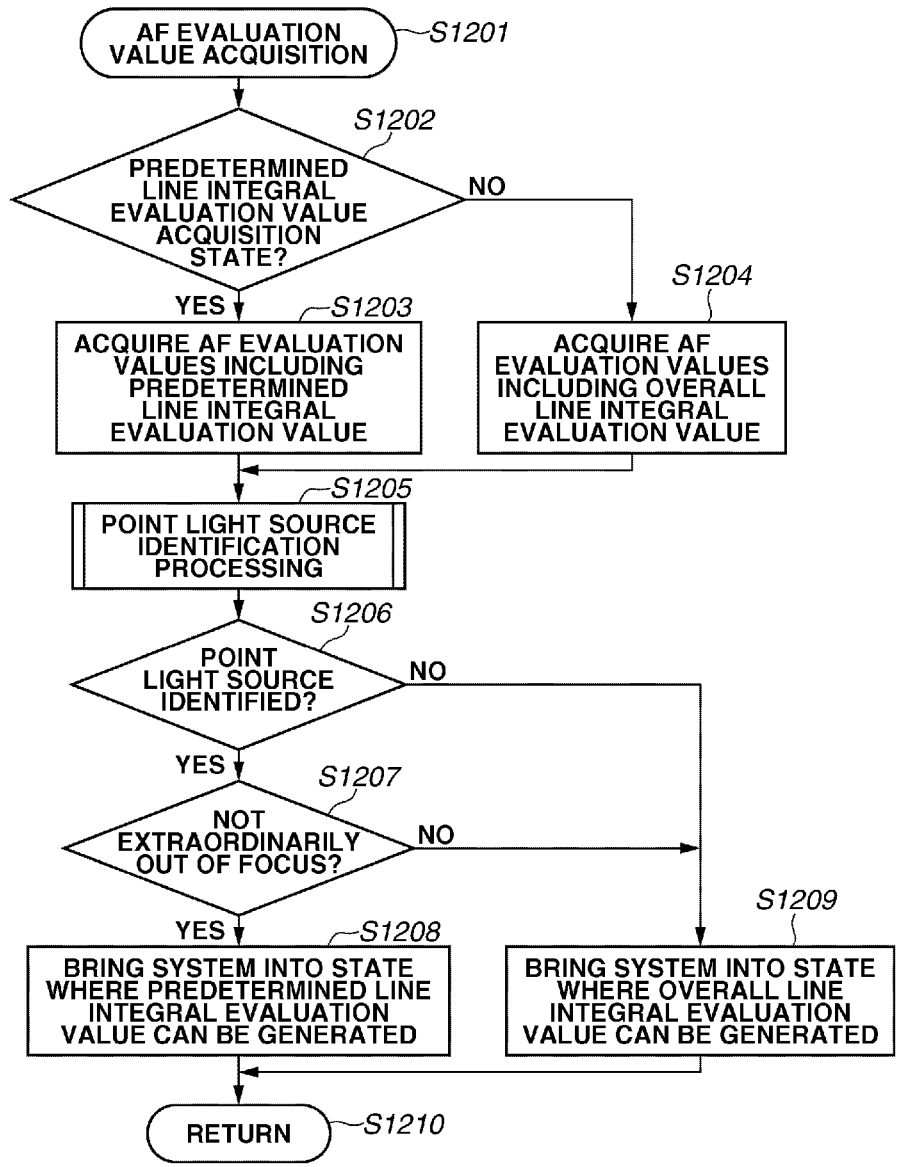
FIG. 9 is a flowchart illustrating AF evaluation value acquisition processing included in the AF processing according to the first exemplary embodiment of the present invention.
Figure 10:
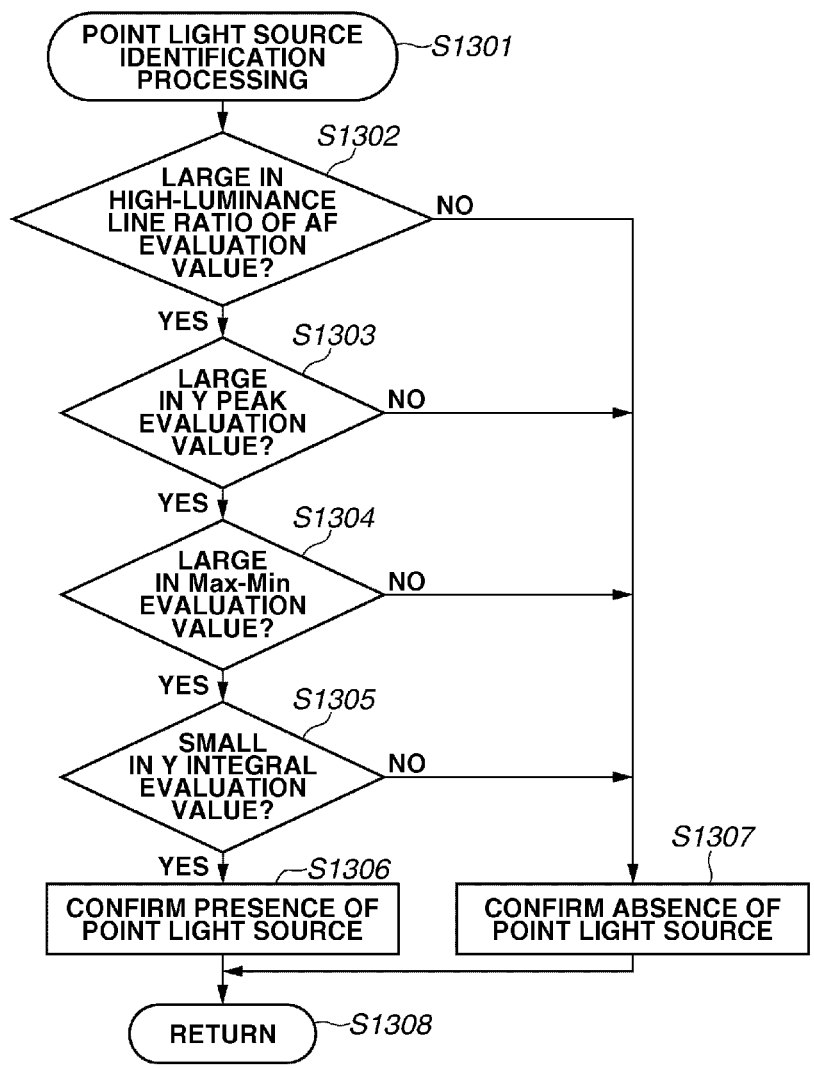
FIG. 10 is a flowchart illustrating point light source identification processing according to the first exemplary embodiment of the present invention.

Next, the point light source identification processing to be performed in step 1205 illustrated in FIG. 9 is described below with reference to FIG. 10. In step 1301, the microcomputer controller 125 starts the point light source identification processing.

In step 1302, the microcomputer controller 125 determines whether the high-luminance line ratio of the AF evaluation value is large. If the microcomputer controller 125 determines that the high-luminance line ratio is large (Yes in step 1302), the processing proceeds to step 1303. If the microcomputer controller 125 determines that the high-luminance line ratio is small (No in step 1302), the processing proceeds to step 1307.

The microcomputer controller 125 obtains the high-luminance line ratio of the AF evaluation value by comparing the integral evaluation value with the integral evaluation value Hi. If the difference between the integral evaluation value and the integral evaluation value Hi is small, the ratio of the high-luminance line peak value as a part of the integral evaluation value is high. In a case where a point light source object is present, the ratio of the high-luminance line peak value as a part of the integral evaluation value is high. Therefore, the microcomputer controller 125 can identify the presence of a point light source object with reference to the ratio of the high-luminance line peak value.

When the system uses the predetermined line integral evaluation value, while the system generates the overall line integral evaluation value Hi, the system does not generate the overall line integral evaluation value. Therefore, the microcomputer controller 125 cannot compare the overall line integral evaluation value with the overall line integral evaluation value Hi.

Accordingly, the microcomputer controller 125 holds the overall line integral evaluation value Hi beforehand at switching timing of the selector switch from generation of the overall line integral evaluation value to generation of the predetermined line integral evaluation value.

The microcomputer controller 125 compares a newly acquired overall line integral evaluation value Hi with the stored value. If a reduction amount of the newly acquired overall line integral evaluation value Hi is large, the microcomputer controller 125 regards the high-luminance line ratio of the AF evaluation value as being not large and performs the control.

If a point light source object is present, the Y peak evaluation value is large. Therefore, in step 1303, the microcomputer controller 125 determines whether the Y peak evaluation value is larger than a predetermined value. If the microcomputer controller 125 determines that the Y peak evaluation value is larger (Yes in step 1303), the processing proceeds to step 1304. If the microcomputer controller 125 determines that the Y peak evaluation value is smaller (No in step 1303), the processing proceeds to step 1307.

If a point light source object is present, the difference between maximum and minimum luminance values of the lines where the point light source is present is large. Therefore, in step 1304, the microcomputer controller 125 determines whether the Max-Min evaluation value is larger than a predetermined value. If the microcomputer controller 125 determines that the Max-Min evaluation value is larger than the predetermined value (Yes in step 1304), the processing proceeds to step 1305.

If the microcomputer controller 125 determines that the Max-Min evaluation value is equal to or smaller than the predetermined value (No in step 1304), the processing proceeds to step 1307. In general, the entire screen is dark in a shooting operation for a point light source object. Therefore, in step 1305, the microcomputer controller 125 determines whether the Y integral evaluation value is smaller than a predetermined value.

If the microcomputer controller 125 determines that the Y integral evaluation value is smaller than the predetermined value (Yes in step 1305), the processing proceeds to step 1306. If the microcomputer controller 125 determines that the Y integral evaluation value is equal to or greater than the predetermined value (No in step 1305), the processing proceeds to step 1307.

Through the above-described sequential determination processing, in step 1306, the microcomputer controller 125 confirms the presence of a point light source. Then, in step 1308, the microcomputer controller 125 terminates the processing of the flowchart illustrated in FIG. 10. The microcomputer controller 125 sets the predetermined line integral evaluation value to be used as the AF evaluation value.

On the other hand, in step 1307, the microcomputer controller 125 does not confirm any point light source. Then, in step 1308, the microcomputer controller 125 terminates the processing of the flowchart illustrated in FIG. 10. The microcomputer controller 125 sets the overall line integral evaluation value to be used as the AF evaluation value.

As described above, the microcomputer controller 125 (i.e., the control unit) moves the focus lens in such a way as to increase the AF evaluation value by repeating reactivation determination→minute driving→hill climb driving→minute driving→reactivation determination. In this case, the point light source identification unit 126 determines the presence of a point light source based on the input AF evaluation value. The microcomputer controller 125 controls the selector switch 116 appropriately to select generation of the overall line integral evaluation value or generation of the predetermined line integral evaluation value.

Figure 3C:
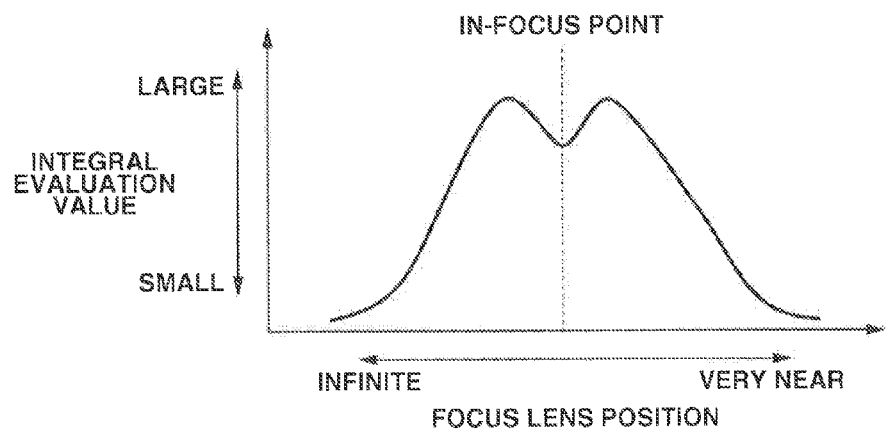
FIG. 3C is a graph illustrating a relationship between focus lens position and integral evaluation value.

As described above, when the microcomputer controller 125 uses the predetermined line integral evaluation value in a shooting operation of a point light source object, the AF evaluation value is maximized at the in-focus position (see FIG. 4C), whereas the AF evaluation value is not maximized at the in-focus position according to the conventional system (see FIG. 3C). Thus, the system according to the present exemplary embodiment can drive the focus lens appropriately to focus on a point light source object, although it was conventionally difficult because the conventional method is based on detection of a minimum value that corresponds to the in-focus point.

Further, the system according to the present exemplary embodiment can perform TV-AF operation stably because the system switches between overall line integral evaluation value and the predetermined line integral evaluation value to control the focus lens in such a way as to increase the AF evaluation value irrespective of the presence of a point light source.

Further, providing the selector switch to select an integral evaluation value to be used is useful because the number of data buses can be reduced. Further, the hardware scale can be reduced, and the cost reduction can be realized.

In the above-described control, the system can perform focus adjustment control according to an appropriate algorithm in the case of setting a plurality of AF frames. For example, the system can perform the above-described control on only one target AF frame (e.g., a very near AF frame or an intermediate AF frame). Further, the system can perform the above-described control based on an AF evaluation value that can be calculated (e.g., as an average value) based on integral evaluation values (e.g., predetermined line integral evaluation values or overall line integral evaluation values) of AF frames where a target point light source object is present or AF frames where the point light source object is not present.

Further, in a case where there is a plurality of AF frames to be processed, the system can acquire a predetermined line integral evaluation value from one AF frame and then can generate a final AF evaluation value by adding predetermined line integral evaluation values generated by respective AF frames.

Next, a second exemplary embodiment of the present invention is described below. The second exemplary embodiment differs from the first exemplary embodiment in the following features. The system according to the first exemplary embodiment uses the selector switch (i.e., a hardware device) to generate the predetermined line integral evaluation value or the overall line integral evaluation value selectively considering the presence of a point light source.

On the other hand, the system according to the second exemplary embodiment is configured to generate both the predetermined line integral evaluation value and the overall line integral evaluation value constantly. Further, the system according to the second exemplary embodiment employs a software configuration to select an integral evaluation value to be used considering the presence of a point light source.

Thus, both the overall line integral evaluation value and the predetermined line integral evaluation value are constantly available, although the hardware scale is larger compared to that of the system described in the first exemplary embodiment. Therefore, the system according to the second exemplary embodiment can generate an AF evaluation value to be used in the AF control by combining both of the integral evaluation values. In other words, the system according to the second exemplary embodiment can realize an algorithm that is higher in degree of freedom.

Figure 12:
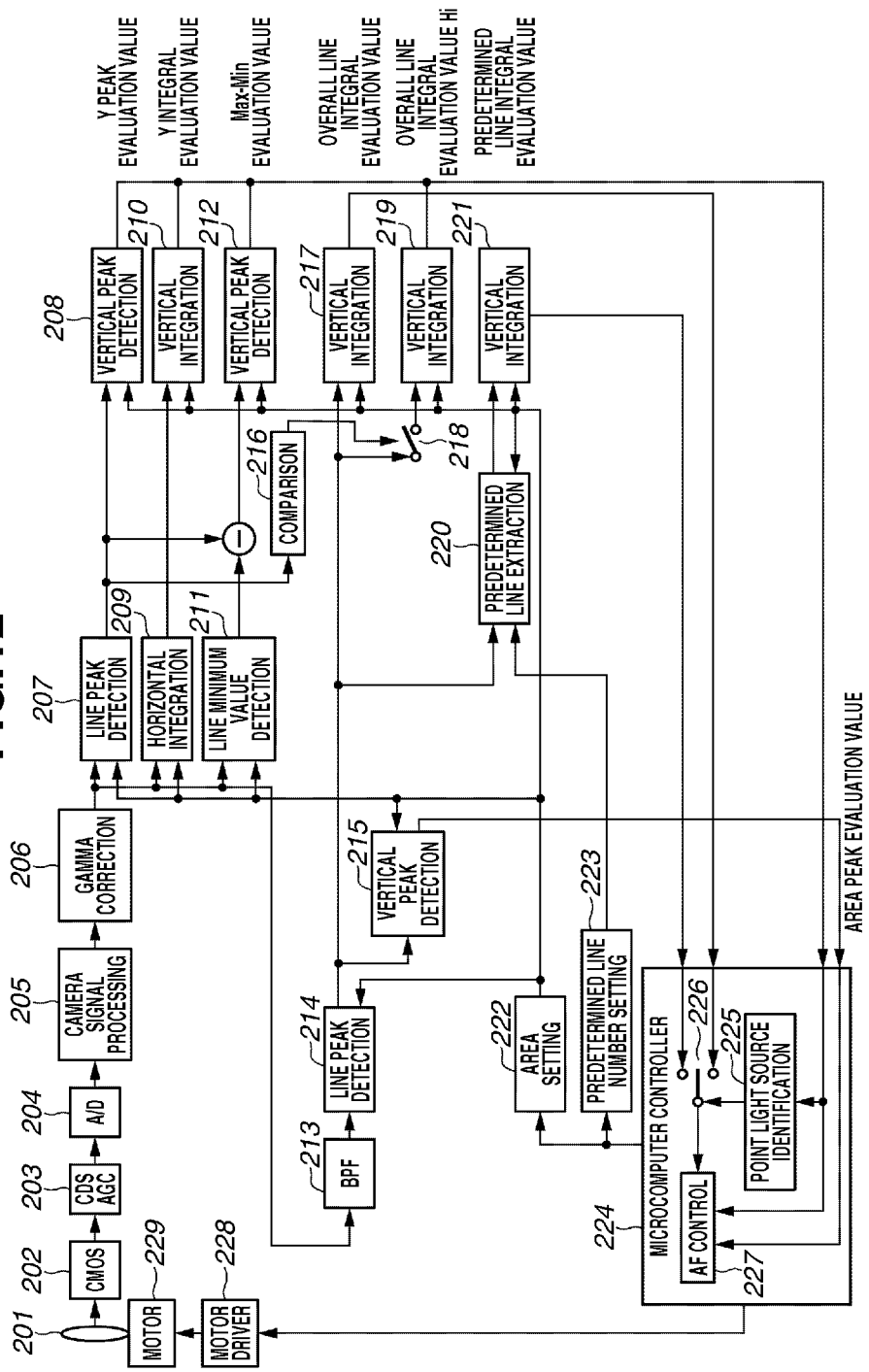
FIG. 12 is a block diagram illustrating an example configuration of a focus adjusting apparatus according to a second exemplary embodiment of the present invention.

FIG. 12 illustrates a configuration of an imaging system (e.g., a video camera) including a focus adjusting apparatus according to the second exemplary embodiment. The video camera configuration according to the present exemplary embodiment is similar to the video camera configuration described in the first exemplary embodiment illustrated with reference to FIG. 1. Thus, various AF evaluation values generated by the video camera are fundamentally similar in type.

Further, a focus lens 201 to a line peak detection circuit 214 illustrated in FIG. 12 are functionally similar to the focus lens 101 to the line peak detection circuit 114 illustrated in FIG. 1. The system according to the present exemplary embodiment processes the output signal of the line peak detection circuit 214 in the following manner.

The line peak detection circuit 214 illustrated in FIG. 12 obtains a line peak value of each horizontal line in an AF frame having been set based on an input focus signal. A vertical peak detection circuit 215 generates an area peak evaluation value by peak-holding the obtained line peak value in the AF frame.

The focus adjusting apparatus according to the present exemplary embodiment has the following characteristic features. The line peak value output from the line peak detection circuit 214 can be added to a vertical integration circuit 217 and a selector switch 218 and can be input to a predetermined line peak extraction circuit 220. First, the vertical integration circuit 217 generates an overall line integral evaluation value by integrating the line peak values in the vertical direction.

Further, the line peak value is input to the selector switch 218. The Y peak value (i.e., an output of a line peak detection circuit 207) is input to a comparator 216 having a predetermined threshold set beforehand by a microcomputer controller 224. The comparator 216 controls the selector switch 218 in such a way as to pass only the line peak value whose Y peak value is greater than the predetermined threshold.

Thus, a vertical integration circuit 219 integrates only line peak values whose Y peak values are greater than the predetermined threshold and outputs the integrated value as an overall line integral evaluation value Hi. The microcomputer controller 224 compares the overall line integral evaluation value with the overall line integral evaluation value Hi and determines whether the ratio of high-luminance line components of the integral evaluation value is greater than the ratio of other components based on the comparison result.

On the other hand, the line peak values input to the predetermined line extraction circuit 220 are extracted by the microcomputer controller 224 in descending order of magnitude by an amount corresponding to a predetermined line number having been set by a predetermined line number setting circuit 223, which serves as a line number setting unit, as illustrated in FIG. 11. The microcomputer controller 224 uses an extraction method similar to that for the predetermined line extraction circuit 121 according to the first exemplary embodiment, illustrated in FIG. 1.

Then, a vertical integration circuit 221 integrates the line peak values extracted by the predetermined line extraction circuit 220 and outputs the integrated value as a predetermined line integral evaluation value. The second exemplary embodiment differs from the first exemplary embodiment in the following features.

In the first exemplary embodiment, the microcomputer controller 125 inputs either the overall line integral evaluation value or the predetermined line integral evaluation value selected by the selector switch 116. On the other hand, in the present exemplary embodiment, the microcomputer controller 224 simultaneously inputs both the overall line integral evaluation value and the predetermined line integral evaluation value.

An area setting circuit 222 and the predetermined line number setting circuit 223 are functionally similar to the area setting circuit 123 and the predetermined line number setting circuit 124 described in the first exemplary embodiment with reference to FIG. 1.

The microcomputer controller 224 sets at least one AF frame gate corresponding to a predetermined position in the screen for the area setting circuit 222. Further, the microcomputer controller 224 sets the predetermined number of lines for the predetermined line number setting circuit 223. In this respect, the function of the microcomputer controller 224 is similar to that of the microcomputer controller 125 described in the first exemplary embodiment.

The focus adjusting apparatus according to the second exemplary embodiment has the following characteristic features. The microcomputer controller 224 includes a point light source identification unit 225 and can determine the presence of a point light source based on Y peak evaluation value, Y integral evaluation value, Max-Min evaluation value, overall line integral evaluation value, and overall line integral evaluation value Hi. The microcomputer controller 224 has a software configuration serving as a switching unit 226 that can select an AF evaluation value to be used according to the determined result.

The microcomputer controller 224 includes an AF control unit 227 that can determine whether to use the overall line integral evaluation value or use the predetermined line integral evaluation value. The microcomputer controller 224 controls a motor 229 via a motor driver 228 based on the AF evaluation value determined by the AF control unit 227. The motor 229 moves the focus lens 201 in the optical axis direction to perform AF control.

In the first exemplary embodiment, the system has the hardware configuration (i.e., the selector switch 116) to selectively use the overall line integral evaluation value or the predetermined line integral evaluation value based on the determination result obtained by the point light source identification unit 126 illustrated in FIG. 1.

On the other hand, the system according to the present exemplary embodiment has the software configuration (i.e., the switching unit 226) to selectively use the overall line integral evaluation value or the predetermined line integral evaluation value based on the determination result obtained by the point light source identification unit 225 illustrated in FIG. 12.

Next, an example AF control that can be performed by the microcomputer controller 224 is described below. The AF control according to the present exemplary embodiment is similar to the AF control described in the first exemplary embodiment with reference to FIG. 5 to FIG. 8.

First, the AF evaluation value acquisition processing according to the present exemplary embodiment to be performed in step 710 illustrated in FIG. 5, steps 803 and 805 illustrated in FIG. 6, and step 1002 illustrated in FIG. 8A is described below with reference to FIG. 13. Then, the point light source identification processing to be performed in step 1603 is described below with reference to FIG. 10.

Figure 13:
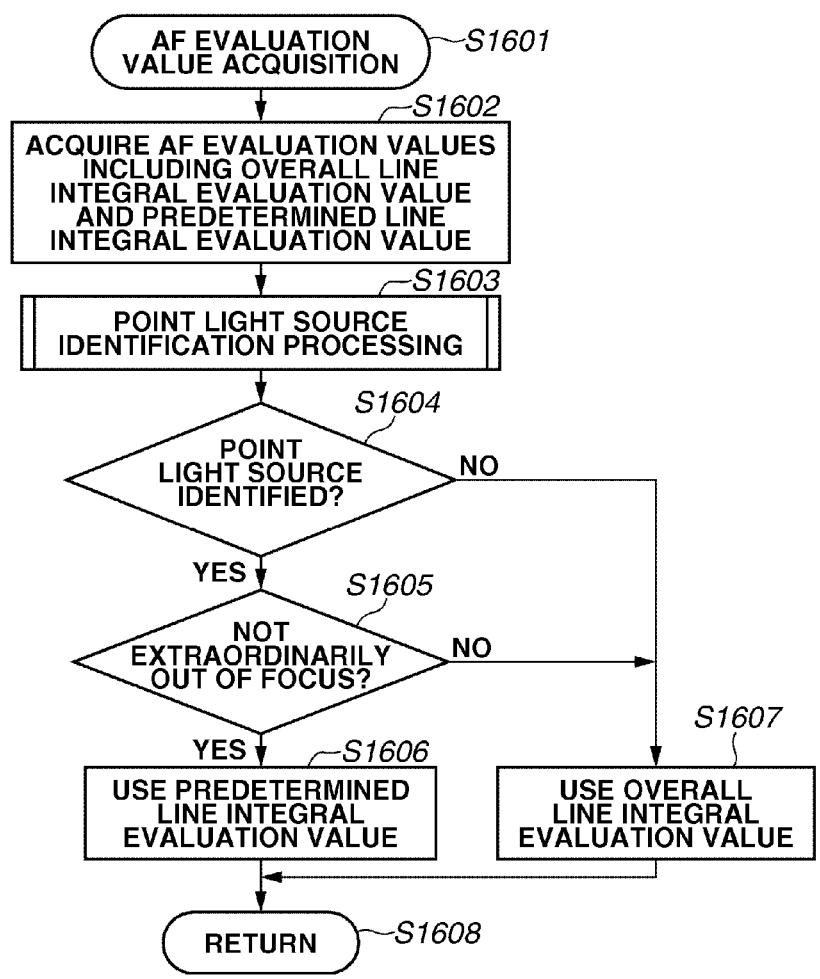
FIG. 13 is a flowchart illustrating AF evaluation value acquisition processing included in the AF processing according to the second exemplary embodiment of the present invention.

First, in step 1601 illustrated in FIG. 13, the microcomputer controller 224 starts the AF evaluation value acquisition processing. In step 1602, the microcomputer controller 224 acquires various AF evaluation values including both the overall line integral evaluation value and the predetermined line integral evaluation value generated by the AF evaluation value generation circuit.

In step 1603, the point light source identification unit 225 illustrated in FIG. 12 performs point light source identification processing. If the microcomputer controller 224 determines that the point light source is present (Yes in step 1604), the processing proceeds to step 1605. If the microcomputer controller 224 determines that the point light source is not present (No in step 1604), the processing proceeds to step 1607. In step 1605, the microcomputer controller 224 checks the present focus state.

If the microcomputer controller 224 determines that the presently captured image of the point light source is not extraordinarily out of focus (Yes in step 1605), the processing proceeds to step 1606. If the microcomputer controller 224 determines that the captured image is extraordinarily out of focus (No in step 1605), the processing proceeds to step 1607.

In step 1606, the microcomputer controller 224 employs the predetermined line integral evaluation value as the AF evaluation value to be used because the point light source is present. Then, in step 1608, the microcomputer controller 224 terminates the AF evaluation value acquisition processing illustrated in FIG. 13.

On the other hand, in step 1607, the microcomputer controller 224 employs the overall line integral evaluation value as the AF evaluation value to be used because the point light source is not present. Then in step 1608, the microcomputer controller 224 terminates the AF evaluation value acquisition processing. As described above, similar to the first exemplary embodiment, the microcomputer controller 224 can drive the focus lens appropriately in a case where a point light source object is included in a scene or even in a case where there is not any point light source object in a scene.

The point light source identification processing to be performed in step 1603 illustrated in FIG. 13 is described in detail below with reference to FIG. 10. The point light source identification processing according to the present exemplary embodiment is different from that described in the first exemplary embodiment only in the processing to be performed in step 1302 illustrated in FIG. 10.

More specifically, in step 1302, the microcomputer controller 224 determines whether the high-luminance line ratio of the AF evaluation value is large. If the ratio is large (Yes in step 1302), the processing proceeds to step 1303. If the ratio is small (No in step 1302), the processing proceeds to step 1307. As described in the first exemplary embodiment, the microcomputer controller 224 can obtain the high-luminance line ratio of the AF evaluation value by comparing the integral evaluation value with the integral evaluation value Hi.

Compared to the first exemplary embodiment, the present invention is unique in constantly generating both the overall line integral evaluation value and the overall line integral evaluation value Hi even when the system uses the predetermined line integral evaluation value. Therefore, the microcomputer controller 224 can determine the high-luminance line ratio based on these values.

In the first exemplary embodiment, the microcomputer controller holds the overall line integral evaluation value Hi at timing where the evaluation value to be used is switched from the overall line integral evaluation value to the predetermined line integral evaluation value. The microcomputer controller determines the high-luminance line ratio based on the held value. However, the accuracy in this case may be lower compared to a case where the overall line integral evaluation value is constantly compared with the overall line integral evaluation value Hi.

On the other hand, in the present exemplary embodiment, the microcomputer controller 224 can constantly compare the overall line integral evaluation value with the overall line integral evaluation value Hi. Therefore, the microcomputer controller 224 can perform point light source determination with higher accuracy.

Similar to the first exemplary embodiment, the system according to the present exemplary embodiment can drive the focus lens appropriately to focus on a point light source object based on the predetermined line integral evaluation value.

Further, the system according to the present exemplary embodiment can perform TV-AF operation stably because the system switches between the overall line integral evaluation value and the predetermined line integral evaluation value to control the focus lens in such a way as to increase the AF evaluation value irrespective of the presence of a point light source.

Further, in the present exemplary embodiment, both the overall line integral evaluation value and the predetermined line integral evaluation value are constantly available. Therefore, the system according to the present exemplary embodiment can generate an AF evaluation value to be used in the AF control by combining both of the integral evaluation values. In other words, the system according to the present exemplary embodiment can realize an algorithm that is higher in degree of freedom.

More specifically, the switching operation according to the present exemplary embodiment is not limited to simple switching between the overall line integral evaluation value and the predetermined line integral evaluation value. For example, the system according to the present exemplary embodiment can generate an AF evaluation value by adding the overall and predetermined line integral evaluation values at a predetermined ratio with reference to the presence of a point light source and can perform AF control based on the generated AF evaluation value.

As a typical example, the system according to the present exemplary embodiment can perform focus adjustment using an AF evaluation value obtainable by prioritizing the predetermined line integral evaluation value (namely, obtainable by giving a greater weight to the predetermined line integral evaluation value) if a point light source is present. Further, the system according to the present exemplary embodiment can perform focus adjustment using an AF evaluation value obtainable by prioritizing the overall line integral evaluation value if there is not any point light source.

Next, a third exemplary embodiment of the present invention is described below. The present exemplary embodiment uses a simple circuit configuration capable of realizing effects comparable to those described in the first and second exemplary embodiments. More specifically, the system according to the present exemplary embodiment does not include any circuit comparable to the predetermined line extraction circuit 121 described in the first exemplary embodiment (see FIG. 1) or the predetermined line extraction circuit 220 described in the second exemplary embodiment (see FIG. 12).

Although the system according to the third exemplary embodiment cannot generate the predetermined line integral evaluation value described in the first and second exemplary embodiments, the system according to the third exemplary embodiment sets a predetermined number of AF frames (i.e., a plurality of areas) and regards respective AF frames as scanning lines so that the system can drive the focus lens appropriately to focus on a point light source object.

Figure 14:
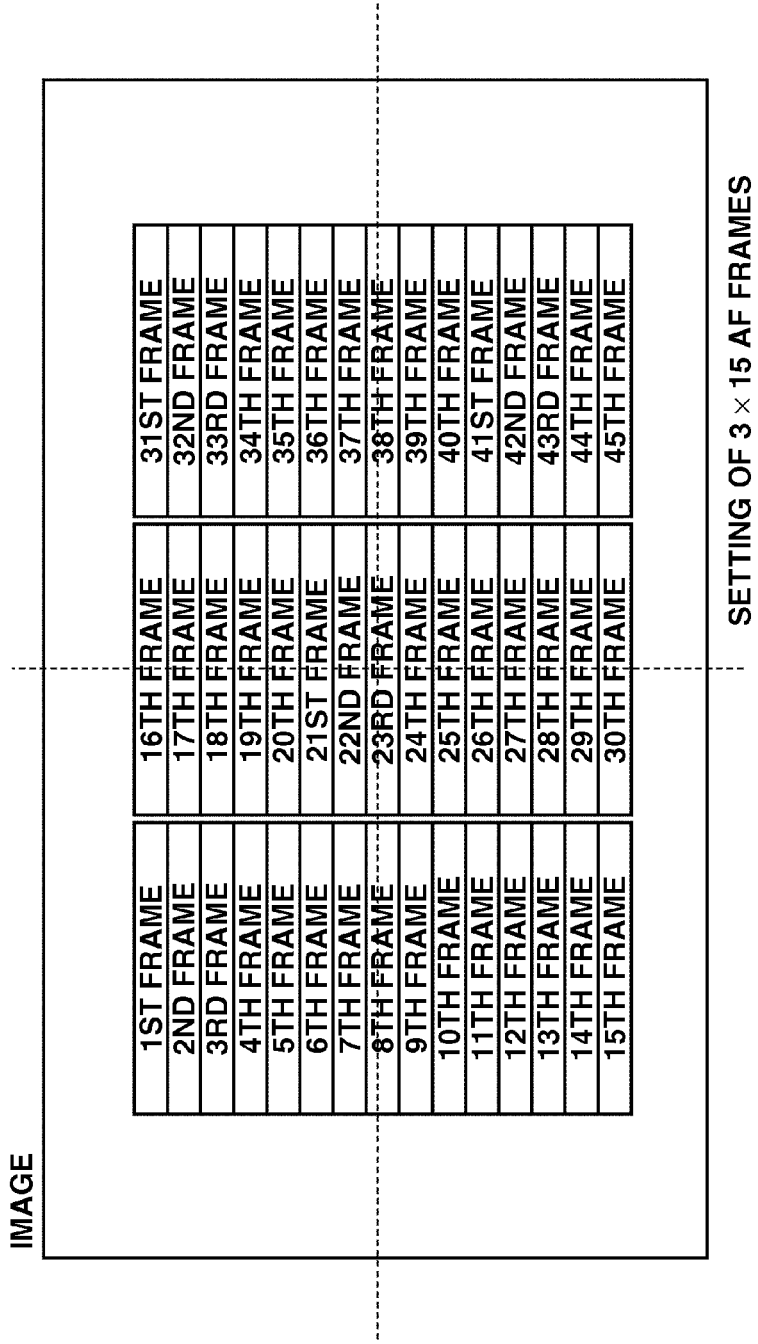
FIG. 14 illustrates an example setting of AF frames in an image plane that can be realized by a focus adjusting apparatus according to a third exemplary embodiment of the present invention.

In the present exemplary embodiment, the system divides the image plane into a plurality of AF frames (e.g., 3×15 areas) as illustrated in FIG. 14. Although the first and second exemplary embodiments have been described using the expression "integration", the present exemplary embodiment may also use a different expression "addition" for the purpose of avoiding any confusion.

Figure 17:
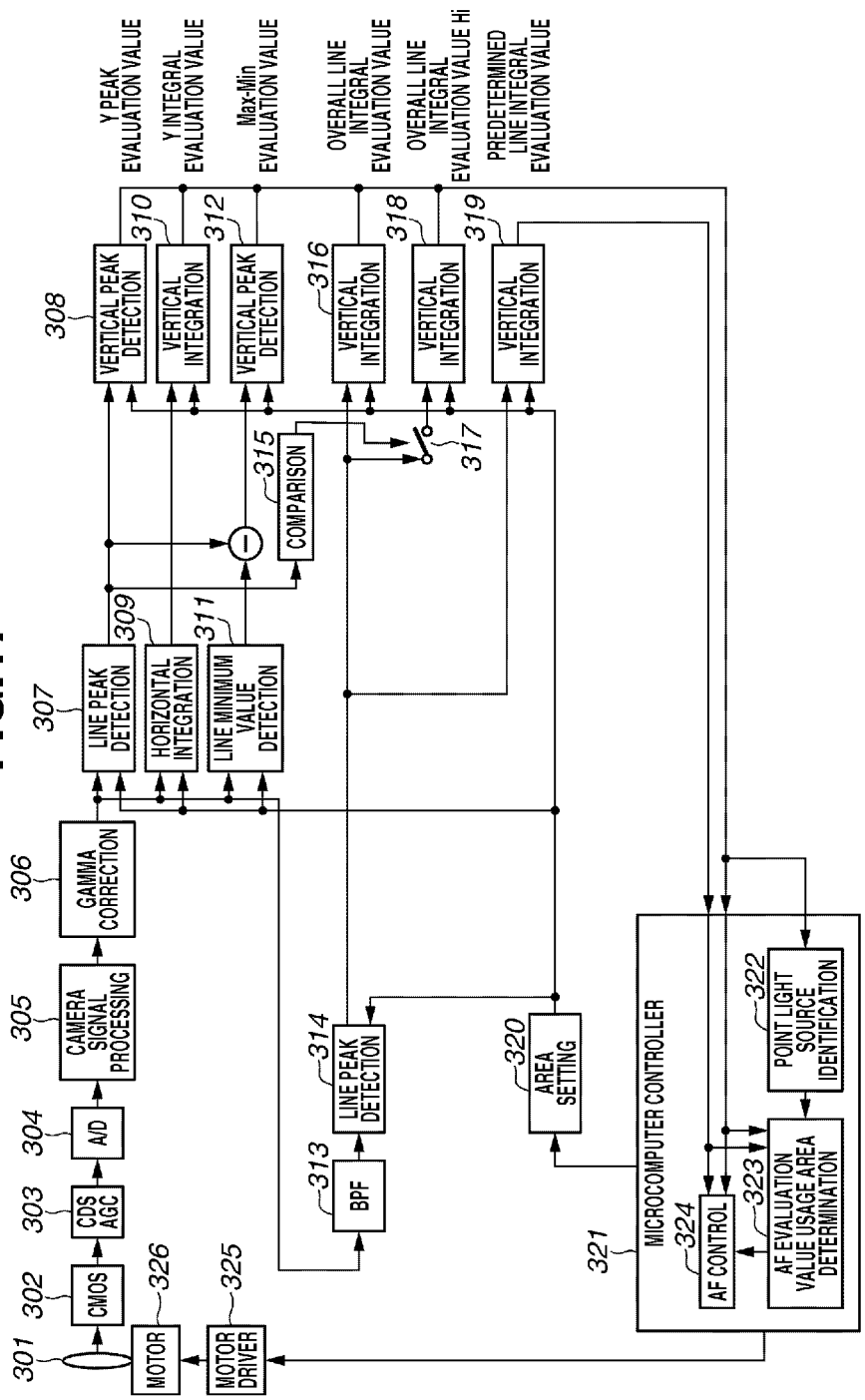
FIG. 17 is a block diagram illustrating an example configuration of a focus adjusting apparatus according to the third exemplary embodiment of the present invention.

FIG. 17 illustrates a configuration of an imaging system (e.g., a video camera) including a focus adjusting apparatus according to the third exemplary embodiment. The video camera configuration according to the present exemplary embodiment is similar to the video camera configuration described in the first exemplary embodiment with reference to FIG. 1.

Further, a focus lens 301 to a line peak detection circuit 314 illustrated in FIG. 17 are functionally similar to the focus lens 101 to the line peak detection circuit 114 illustrated in FIG. 1. The system according to the present exemplary embodiment processes the output signal of the line peak detection circuit 314 in the following manner.

First, the line peak detection circuit 314 illustrated in FIG. 17 acquires a line peak value of each horizontal line in a target AF frame from a focus signal input by a band-pass filter (BPF) 313 that serves as a generation unit. The present exemplary embodiment has the following features. The line peak detection circuit 314 outputs the obtained line peak value to each of a vertical integration circuit 316, a selector switch 317, and a vertical peak detection circuit 319. The vertical peak detection circuit 319 is functionally operable as a peak holding unit. More specifically, the system according to the present exemplary embodiment does not include any circuit that can generate the predetermined line integral evaluation value described in the first and second exemplary embodiments.

The vertical integration circuit 316 generates an overall line integral evaluation value based on the received line peak value. While the line peak value is input to the selector switch 317, an output (i.e., Y peak value) of a line peak detection circuit 307 is sent to a comparator 315. The comparator 315 has a predetermined threshold having been set beforehand by a microcomputer controller 321.

The comparator 315 controls the selector switch 317 in such a way as to pass only the line peak value whose Y peak value is greater than the predetermined threshold. Thus, a vertical integration circuit 318 integrates only line peak values whose Y peak values are greater than the predetermined threshold and outputs the integrated value as an overall line integral evaluation value Hi.

The microcomputer controller 321 compares the overall line integral evaluation value with the overall line integral evaluation value Hi and determines whether the ratio of high-luminance line components of the integral evaluation value is greater than the ratio of other components based on the comparison result.

Further, the vertical peak detection circuit 319 generates an area peak evaluation value of the AF frame (each target area) based on the received line peak value.

As described above, in the present exemplary embodiment, the microcomputer controller 321 receives only the overall line integral evaluation value, the overall line integral evaluation value Hi, and the area peak evaluation value (i.e., the evaluation values other than the predetermined line integral evaluation value) for each AF frame that can be regarded as a scanning line.

An area setting circuit 320 is functionally similar to the area setting circuit 123 described in the first exemplary embodiment with reference to FIG. 1. The microcomputer controller 321 sets at least one AF frame gate corresponding to a predetermined position in the screen for the area setting circuit 320, similar to the microcomputer controller described in the first and second exemplary embodiments.

The focus adjusting apparatus according to the third exemplary embodiment has the following characteristic features. The microcomputer controller 321 includes a point light source identification unit 322 and can determine the presence of a point light source based on Y peak evaluation value, Y integral evaluation value, Max-Min evaluation value, overall line integral evaluation value, and overall line integral evaluation value Hi.

An AF evaluation value usage area determination unit 323 serves as a selection unit configured to determine an area (i.e., AF frame) to be used and an AF evaluation value to be used based on the determination result. Thus, the microcomputer controller 321 including the third evaluation value generation unit can generate an AF evaluation value by integrating area peak evaluation values of a predetermined number of AF frames corresponding to a designated area number in descending order of magnitude, in the AF frames where the point light source is present, when the microcomputer controller 321 drives the focus lens to focus on a point light source object.

Thus, the microcomputer controller 321 can generate the AF evaluation value that is maximized at the in-focus point even when the target is a point light source object, similar to the predetermined line integral evaluation value obtained by vertically integrating line peak values in descending order of magnitude as described in the first and second exemplary embodiments.

As understood from the foregoing description, it is feasible to drive the focus lens appropriately to focus on a point light source object even in a system that cannot generate the predetermined line integral evaluation value, if the microcomputer controller can identify AF frames where the point light source is present and use an AF evaluation value obtained by adding area peak evaluation values of a predetermined number of AF frames in descending order of magnitude. If the target object is other than the point light source, the microcomputer controller uses the overall line integral evaluation value.

Figure 16B:
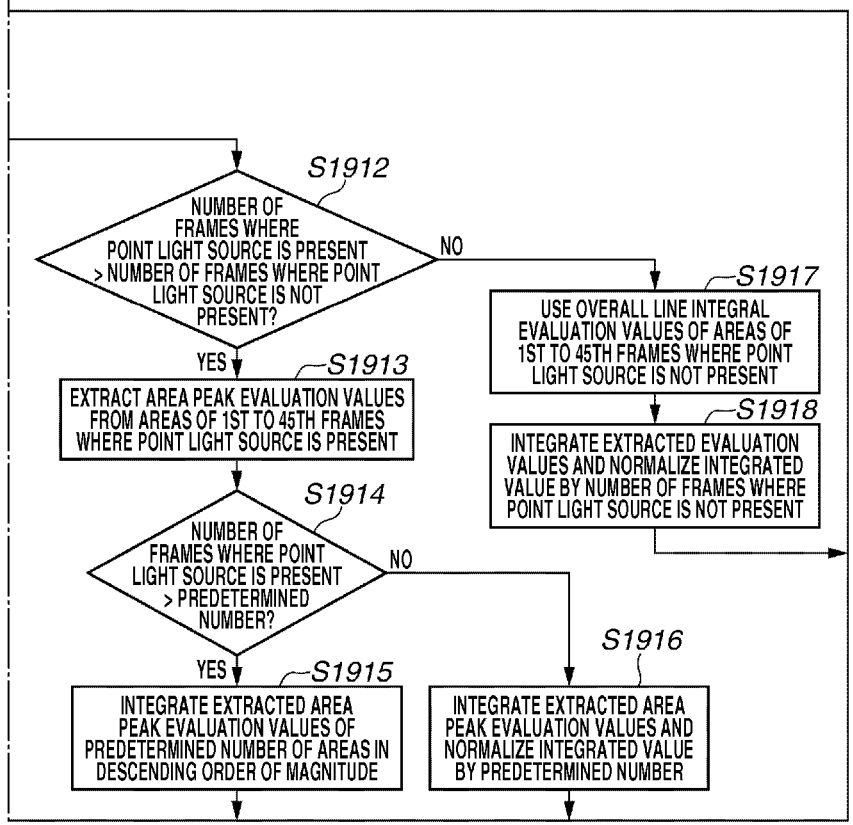
FIG. 16 is a flowchart illustrating AF evaluation value and AF frame determination processing according to the third exemplary embodiment of the present invention.

Processing that can be performed by the AF evaluation value usage area determination unit 323 is described in detail below with reference to FIG. 16. The microcomputer controller 321 controls a motor 326 via a motor driver 325 based on each AF evaluation value generated by the AF control unit 324 and the AF frame position/number determined by the determination unit 323. The motor 326 moves the focus lens 301 in the optical axis direction to perform AF control.

An example AF control that can be performed by the microcomputer controller 321 according to the present exemplary embodiment is described below with reference to FIG. 17. The AF control according to the present exemplary embodiment is similar to that described in the first exemplary embodiment with reference to FIG. 5 to FIG. 8 and FIG. 10.

Figure 15:
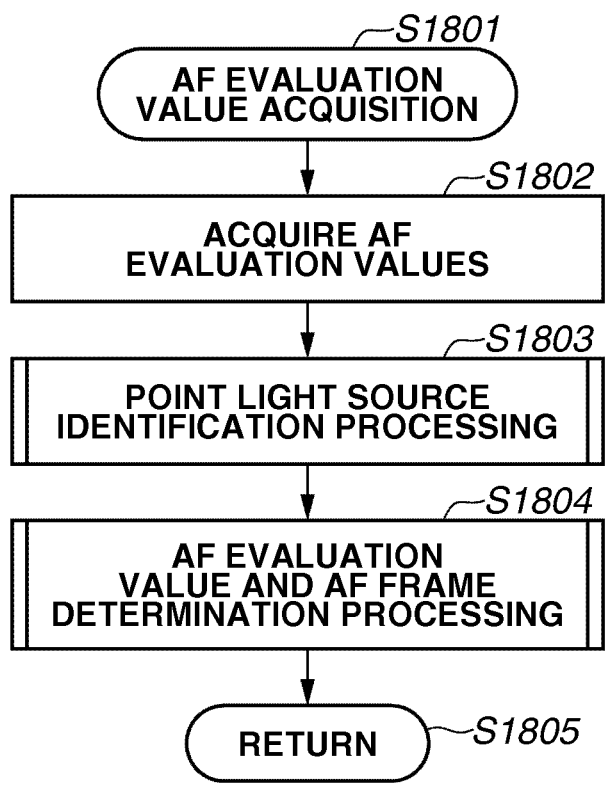
FIG. 15 is a flowchart illustrating AF evaluation value acquisition processing included in the AF processing according to the third exemplary embodiment of the present invention.

The AF evaluation value acquisition processing according to the present exemplary embodiment to be performed in step 710 illustrated in FIG. 5, steps 803 and 805 illustrated in FIG. 6, and step 1002 illustrated in FIG. 8A is described below with reference to FIG. 15. In step 1801, the microcomputer controller 321 starts the AF evaluation value acquisition processing. In step 1802, the microcomputer controller 321 acquires AF evaluation values generated by the AF evaluation value generation circuit.

In step 1803, the point light source identification unit 322 illustrated in FIG. 17 performs point light source identification processing. In step 1804, the microcomputer controller 321 determines AF evaluation values and AF frames to be used (i.e., some of a plurality of AF frames illustrated in FIG. 14) based on the AF evaluation values obtained in step 1802 and the point light source determination result obtained in step 1803. Then, in step 1805, the microcomputer controller 321 terminates the AF evaluation value acquisition processing.

The focus adjusting apparatus according to the present exemplary embodiment has the following characteristic features. The AF evaluation value and AF frame determination processing to be performed in step 1804 is described below with reference to FIG. 16. In step 1901, the microcomputer controller 321 starts the processing to be performed in step 1804.

In step 1902, the microcomputer controller 321 determines whether there is any point light source in the 1st to 45th AF frames. If the microcomputer controller 321 determines that a point light source is present in any one of the 1st to 45th AF frames (Yes in step 1902), the processing proceeds to step 1903. If the microcomputer controller 321 determines that there is not any point light source in the 1st to 45th AF frames (No in step 1902), the processing proceeds to step 1919. In other words, when there is not any point light source, the microcomputer controller 321 needs not use any evaluation value that corresponds to the predetermined line integral evaluation value.

In step 1903, the microcomputer controller 321 determines whether the presently captured image of the point light source is not extraordinarily out of focus. If the microcomputer controller 321 determines that the captured image is not extraordinarily out of focus (Yes in step 1903), the processing proceeds to step 1904. If the microcomputer controller 321 determines that the captured image is extraordinarily out of focus (No in step 1903), the processing proceeds to step 1919.

If the captured image is extraordinarily out of focus, the microcomputer controller 321 uses the overall line integral evaluation value (i.e., a stable and low-noise signal) because there is not any problem relating to the point light. In step 1919, the microcomputer controller 321 determines to use overall line integral evaluation values of the 1st to 45th frames illustrated in FIG. 14. Finally, in step 1920, the microcomputer controller 321 terminates the processing of the flowchart illustrated in FIG. 16.

If the microcomputer controller 321 determines that a point light source is present in any one of the 1st to 45th frames (Yes in step 1902) and the presently captured image of the point light source is not extraordinarily out of focus (Yes in step 1903), the processing proceeds to step 1904. In step 1904, the microcomputer controller 321 determines whether the point light source is present in any one of the 20th to 27th frames (i.e., the AF frames positioned at the center of the screen).

If the microcomputer controller 321 determines that the point light source is present in any one of the 20th to 27th frames (Yes in step 1904), the processing proceeds to step 1905. If the microcomputer controller 321 determines that the point light source is not present in anyone of the 20th to 27th frames (No in step 1904), the processing proceeds to step 1909.

More specifically, the microcomputer controller 321 determines that the target object is the point light source if the point light source is present in the central region (the 20th to 27th AF frames) of the screen based on assumption that the target object is generally positioned at the center of the screen.

The focus adjusting apparatus according to the present exemplary embodiment has the following characteristic features. In step 1905, the microcomputer controller 321 extracts area peak evaluation values from the areas of the 1st to 45th frames where the point light source is present. Then, the processing proceeds to step 1906.

In step 1906, the microcomputer controller 321 determines whether the number of the frames where the point light source is present is greater than a predetermined number having been set beforehand. If the number of the frames is greater than the predetermined number (Yes in step 1906), the processing proceeds to step 1907. If the number of the frames is not greater than the predetermined number (No in step 1906), the processing proceeds to step 1908.

In step 1907, the microcomputer controller 321 generates an integral AF evaluation value by adding a predetermined number of area peak values of the AF frames extracted in step 1905 in descending order of magnitude. Finally, in step 1920, the microcomputer controller 321 terminates the processing of the flowchart illustrated in FIG. 16.

On the other hand, in step 1908, the microcomputer controller 321 does not add the predetermined number of area peak values because the number of the frames where the point light source is present is not greater than the predetermined number. Therefore, the microcomputer controller 321 changes the number of area peak values extracted from the frames where the point light source is present to the number of the frames where the point light source is present and obtains an addition value.

The microcomputer controller 321 normalizes the addition value by multiplying it by "predetermined number having been set beforehand/number of frames where the point light source is present" to obtain a value comparable to the predetermined area number. The microcomputer controller 321 sets the normalized value as an AF evaluation value to be used. Finally, in step 1920, the microcomputer controller 321 terminates the processing of the flowchart illustrated in FIG. 16.

Through the above-described processes, even if a system is configured to generate only area peak evaluation values, the system can generate evaluation values comparable to the predetermined line integral evaluation values described in the first and second exemplary embodiments by adding a predetermined number of area peak values because each AF frame can be regarded as a scanning line.

In this case, the number of the area peak values to be added is a fixed value so that the evaluation value can be prevented from increasing/decreasing in response to a change in the number of point light sources and the evaluation value can be generated stably without being influenced by the number of point light sources.

Further, if the number of the AF frames where the point light source is present is smaller than the predetermined number having been set beforehand, the system decreases the number of area peak values to be added and then adjusts the level by performing normalization. Thus, the system can prevent the evaluation value from decreasing in response to a reduction in the number of point light sources.

In step 1909, namely, when the point light source is not present in any one of the 20th to 27th frames, the microcomputer controller 321 determines whether the overall line integral evaluation value is sufficiently high in any one of the 20th to 27th frames. If the microcomputer controller 321 determines that the overall line integral evaluation value is sufficiently high (Yes in step 1909), the processing proceeds to step 1910. If the microcomputer controller 321 determines that the overall line integral evaluation value is not sufficiently high (No in step 1909), the processing proceeds to step 1912.

In step 1910, the microcomputer controller 321 extracts overall line integral evaluation values from the areas of the 1st to 45th frames where the point light source is not present. Then, in step 1911, the microcomputer controller 321 integrates the extracted integral evaluation values and normalizes the integrated value by the predetermined number having been set beforehand. Finally, in step 1920, the microcomputer controller 321 terminates the processing of the flowchart illustrated in FIG. 16.

In other words, the microcomputer controller 321 determines that the target object is not the point light source because the point light source is not present in the central region. Further, the microcomputer controller 321 determines that the target object is not the point light source because the overall line integral evaluation value of the central frame is sufficiently high. Thus, the microcomputer controller 321 uses the overall line integral evaluation value to perform. AF processing to focus on the object (other than the point light source).

Then, the microcomputer controller 321 uses only the AF frames where the point light source is not present to generate the integral evaluation value stably. Further, the microcomputer controller 321 performs normalization to prevent the evaluation value from varying according to the number of point light sources.

In step 1912, namely, when the point light source is not present in any one of the 20th to 27th frames and the overall line integral evaluation value is not sufficiently high in any one of the 20th to 27th frames, the microcomputer controller 321 determines whether the number of the frames where the point light source is present is greater than the rest of the 1st to 45th frames.

If the microcomputer controller 321 determines that the number of the frames where the point light source is present is greater (Yes in step 1912), the processing proceeds to step 1913. If the microcomputer controller 321 determines that the number of the frames where the point light source is present is smaller (No in step 1912), the processing proceeds to step 1917.

In step 1913, the microcomputer controller 321 extracts area peak values from the areas of the 1st to 45th frames where the point light source is present. Then, in step 1914, the microcomputer controller 321 determines whether the number of the frames where the point light source is present is greater than a predetermined number having been set beforehand.

If the microcomputer controller 321 determines that the number of the frames where the point light source is present is greater than the predetermined number (Yes in step 1914), the processing proceeds to step 1915. If the microcomputer controller 321 determines that the number of the frames where the point light source is present is equal to or smaller than the predetermined number (No in step 1914), the processing proceeds to step 1916.

In step 1915, the microcomputer controller 321 generates an integral AF evaluation value by adding a predetermined number of area peak values of the AF frames extracted in step 1913 in descending order of magnitude. Finally, in step 1920, the microcomputer controller 321 terminates the processing of the flowchart illustrated in FIG. 16.

In step 1916, the microcomputer controller 321 does not add the predetermined number of area peak values because the number of the frames where the point light source is present is not greater than the predetermined number. Therefore, the microcomputer controller 321 changes the number of area peak values extracted from the frames where the point light source is present, to the number of the frames where the point light source is present and obtains an addition value.

The microcomputer controller 321 normalizes the addition value by multiplying it by "predetermined number having been set beforehand/number of frames where the point light source is present" and sets the normalized value as an AF evaluation value to be used. Finally, in step 1920, the microcomputer controller 321 terminates the processing of the flowchart illustrated in FIG. 16.

In other words, the microcomputer controller 321 determines that the target object is not present because the point light source is not present in the central frame and the overall line integral evaluation value is not sufficiently high. Further, the microcomputer controller 321 determines that the target object is a point light source positioned in the outer region of the screen because the number of the AF frames where the point light source is present is greater. Thus, the microcomputer controller 321 performs AF processing to focus on the point light source positioned on the outside.

Further, the microcomputer controller 321 sets the predetermined number to be added, compares the number of frames where the point light source is present with a predetermined number having been set beforehand, and performs normalization by the reasons described in step 1905 to step 1908.

In step 1917, namely, when the point light source is not present in anyone of the 20th to 27th frames and the overall line integral evaluation value is not sufficiently high in any one of the 20th to 27th frames, and further when the number of the frames where the point light source is present is smaller, the microcomputer controller 321 determines to use the overall line integral evaluation values of the areas of the 1st to 45th frames where the point light source is not present. Then, the processing proceeds to step 1918.

In step 1918, the microcomputer controller 321 integrates the extracted integral evaluation values and normalizes the integrated value by a predetermined number having been set beforehand. Finally, in step 1920, the microcomputer controller 321 terminates the processing of the flowchart illustrated in FIG. 16.

In other words, the microcomputer controller 321 determines that the target object is not present in the central region because the point light source is not present in the central frame and the overall line integral evaluation value is not sufficiently high.

Further, the microcomputer controller 321 determines that the target object is not a point light source and is positioned in the outer region of the screen because the number of the AF frames where the point light source is present is smaller. Thus, the microcomputer controller 321 performs AF processing to focus on the target object. Further, the microcomputer controller 321 performs normalization by the reason described in step 1911.

In the present exemplary embodiment, as described above, in a case where a plurality of AF frames can be set, even if a system is configured to generate only the area peak evaluation values, the system generates evaluation values comparable to the predetermined line integral evaluation values by regarding respective AF frames as scanning lines. Thus, the microcomputer controller 321 can drive the focus lens appropriately to focus on a target point light source object.

Thus, the system according to the third exemplary embodiment does not require any complicated circuit to generate the predetermined line integral evaluation values comparable to the predetermined line extraction circuit 121 described in the first exemplary embodiment (see FIG. 1) or the predetermined line extraction circuit 220 described in the second exemplary embodiment (see FIG. 12). Namely, the system according to the third exemplary embodiment can generate predetermined line integral evaluation values with a relatively simple hardware configuration.

Next, a fourth exemplary embodiment of the present invention is described below. Similar to the third exemplary embodiment, the fourth exemplary embodiment is applicable to a system that does not generate the predetermined line integral evaluation value described in the first and second exemplary embodiments. The system according to the present exemplary embodiment sets a plurality of AF frames and regards respective AF frames as scanning lines so that the system can drive the focus lens appropriately to focus on a point light source object.

In the present exemplary embodiment, the system does not set the predetermined number of areas to be added. Instead, the system automatically changes the number of areas to be added according to the number of areas (AF frames) where the point light source is present. The system further performs normalization to obtain a value comparable to the number of areas.

Thus, compared to the third exemplary embodiment, the system according to the present exemplary embodiment can generate an AF evaluation value to be used with a simple algorithm. Although the first and second exemplary embodiments have been described using the expression "integration", the present exemplary embodiment may also use the different expression "addition" for the purpose of avoiding any confusion.

A camera configuration according to the present exemplary embodiment is similar to the camera configuration described in the third exemplary embodiment with reference to FIG. 17. An example AF control according to the present exemplary embodiment is described below. The microcomputer controller 321 illustrated in FIG. 17 performs AF control similar to that described in the third exemplary embodiment.

In the present exemplary embodiment, the microcomputer controller 321 includes a fourth evaluation value generation unit. Further, the AF control according to the present exemplary embodiment is similar to the AF control described in the third exemplary embodiment described with reference to FIG. 7 to FIG. 8, FIG. 10, and FIG. 15.

The AF evaluation value and AF frame determination processing (i.e., the processing to be performed in step 1804 illustrated in FIG. 15) according to the present exemplary embodiment is described below with reference to FIG. 18. Start processing in step 2101 and conditional branch processing in steps 2102, 2103, 2104, 2107, and 2110 are similar to those described in the third exemplary embodiment with reference to FIG. 16.

Further, if the microcomputer controller 321 determines that there is not any point light source in the 1st to 45th frames (No in step 2102) or if the microcomputer controller 321 determines that the presently captured image of the point light source is extraordinarily out of focus (No in step 2103), the processing proceeds to step 2115. Processing to be performed in step 2115 is similar to that described in the third exemplary embodiment with reference to FIG. 16.

Processing to be performed in each of steps 2105, 2106, 2108, 2109, 2111, 2112, 2113, and 2114 has unique characteristics according to the third exemplary embodiment as described below. The microcomputer controller 321 performs the processing of these steps when a point light source is present in any one of the 1st to 45th frames and the presently captured image of the point light source is not extraordinarily out of focus.

First, if the microcomputer controller 321 determines that the point light source is present in any one of the 20th to 27th frames (i.e., the AF frames positioned in the central region of the screen) (Yes in step 2104), the processing proceeds to step 2105. More specifically, the microcomputer controller 321 determines that the target object is the point light source if the point light source is present in the central region (the 20th to 27th AF frames) of the screen based on assumption that the target object is generally positioned at the center of the screen.

In step 2105, the microcomputer controller 321 extracts area peak evaluation values from the areas of the 1st to 45th frames where the point light source is present and adds all of the extracted area peak evaluation values. Then, in step 2106, the microcomputer controller 321 divides the summed-up value obtained in step 2105 by the number of the frames where the point light source is present to obtain a normalized value as an AF evaluation value to be used. Finally, in step 2116, the microcomputer controller 321 terminates the processing of the flowchart illustrated in FIG. 18.

Through the above-described processes, even if a system is configured to generate only area peak evaluation values, the system can generate evaluation values comparable to the predetermined line integral evaluation values described in the first and second exemplary embodiments by adding a predetermined number of area peak values and normalizing the added value because each AF frame can be regarded as a scanning line.

It is desired to generate an AF evaluation value with simple processing without differentiating processing content depending on a specific condition (e.g., reduction of the point light source). This is the reason why the system adds the area peak evaluation values of all frames where the point light source is present and normalizes the obtained value by the number of the frames where the point light source is present.

Although the dynamic range of the AF evaluation value becomes narrower as a result of the normalization, the system needs not set the predetermined number of areas to be added. As the system automatically changes the number of areas to be added according to the number of frames where the point light source is present, the system can simply generate evaluation values regardless of the number of frames where the point light source is present.

Next, if the microcomputer controller 321 determines that there is not any point light source in the 20th to 27th frames (No in step 2104) and if the overall line integral evaluation value is sufficiently high in any one of the 20th to 27th frames (Yes in step 2107), the processing proceeds to step 2108.

In step 2108, the microcomputer controller 321 extracts overall line integral evaluation values from the areas of the 1st to 45th frames where the point light source is not present and adds all of the extracted overall line integral evaluation values.

Then, in step 2109, the microcomputer controller 321 divides the summed-up value obtained in step 2108 by the number of the frames where the point light source is not present to obtain a normalized value as an AF evaluation value to be used. Finally, in step 2116, the microcomputer controller 321 terminates the processing of the flowchart illustrated in FIG. 18.

In other words, the microcomputer controller 321 determines that the target object is not the point light source because the point light source is not present in the central region. Further, the microcomputer controller 321 determines that the target object is not the point light source because the overall line integral evaluation value of the central frame is sufficiently high. Thus, the microcomputer controller 321 uses the overall line integral evaluation value to perform AF processing to focus on the object (other than the point light source).

Then, the microcomputer controller 321 uses only the frames where the point light source is not present to generate the AF evaluation value stably. Further, the microcomputer controller 321 performs normalization to prevent the number of frames to be added from increasing/decreasing according to the number of point light sources and, as a result, prevent the AF evaluation value from varying.

Next, if the microcomputer controller 321 determines that there is not any point light source in the 20th to 27th frames (No in step 2104) and the overall line integral evaluation value is not sufficiently high in anyone of the 20th to 27th frames (No in step 2107), and further if the microcomputer controller 321 determines that the number of the frames where the point light source is present is greater than the rest of the 1st to 45th frames (Yes in step 2110), the processing proceeds to step 2111.

In step 2111, the microcomputer controller 321 extracts area peak evaluation values from the areas of the 1st to 45th frames where the point light source is present and adds all of the extracted area peak evaluation values. Then, in step 2112, the microcomputer controller 321 divides the summed-up value obtained in step 2111 by the number of the frames where the point light source is present to obtain a normalized value as an AF evaluation value to be used. Finally, in step 2116, the microcomputer controller 321 terminates the processing of the flowchart illustrated in FIG. 18.

In other words, the microcomputer controller 321 determines that the target object is not present in the central region because the point light source is not present in the central frame and the overall line integral evaluation value is not sufficiently high. Further, the microcomputer controller 321 determines that the target object is a point light source positioned in the outer region of the screen because the number of the AF frames where the point light source is present is greater. Thus, the microcomputer controller 321 performs AF processing to focus on the point light source positioned on the outside. Further, the microcomputer controller 321 performs normalization by the reasons described in steps 2105 and 2106.

Finally, if the microcomputer controller 321 determines that there is not any point light source in the 20th to 27th frames (No in step 2104) and the overall line integral evaluation value is not sufficiently high in anyone of the 20th to 27th frames (No in step 2107), and further if the microcomputer controller 321 determines that the number of the frames where the point light source is present is smaller (No in step 2110), the processing proceeds to step 2113.

In step 2113, the microcomputer controller 321 extracts overall line integral evaluation values from the areas of the 1st to 45th frames where the point light source is not present and adds all of the extracted overall line integral evaluation values. Then, in step 2114, the microcomputer controller 321 divides the summed-up value obtained in step 2113 by the number of the frames where the point light source is not present to obtain a normalized value as an AF evaluation value to be used. Finally, in step 2116, the microcomputer controller 321 terminates the processing of the flowchart illustrated in FIG. 18.

In other words, the microcomputer controller 321 determines that the target object is not present in the central region because the point light source is not present in the central frame and the overall line integral evaluation value is not sufficiently high. Further, the microcomputer controller 321 determines that the target object is not a point light source and is positioned in the outer region of the screen because the number of the AF frames where the point light source is present is smaller. Thus, the microcomputer controller 321 performs AF processing to focus on the target object. Further, the microcomputer controller 321 performs normalization by the reasons described in steps 2108 and 2109.

In the present exemplary embodiment, as described above, the microcomputer controller 321 generates an evaluation value comparable to the predetermined line integral evaluation value described in the first and second exemplary embodiments by regarding each AF frame as a scanning line. Thus, the microcomputer controller 321 can drive the focus lens appropriately to focus on a target point light source object.

Further, the microcomputer controller 321 can generate an AF evaluation value by adding area peak evaluation values of all frames where the point light source is present and normalizing the obtained value by the number of area where the point light source is present, using a simple algorithm compared to the third exemplary embodiment.

Although the dynamic range of the AF evaluation value becomes narrower, the microcomputer controller 321 needs not set the predetermined number of areas to be added. As the microcomputer controller 321 automatically changes the number of areas to be added according to the number of frames where the point light source is present and performs normalization, the AF evaluation value does not vary depending on the number of frames where the point light source is present.

Although some exemplary embodiments of the present invention has been described, the present invention is not limited to these specific exemplary embodiments and can be modified in various ways without departing from the gist of the present invention. For example, the video camera has been described as a representative system configuration in each exemplary embodiment. However, the present invention can be embodied similarly on a digital still camera or a single-lens reflex camera.

The shooting mode is not limited to either moving image or still image. The above-described point light source identification unit determines the presence of a point light source object based on specific evaluation values (i.e., Y peak evaluation value, Y integral evaluation value, Max-Min evaluation value, and overall line integral evaluation value Hi). However, any other algorithm or evaluation values can be used if it is feasible to identify a target point light source object.

Further, in addition to the depth of focus, it is useful that the size of each AF frame or the number of point light sources appearing on the screen is taken into consideration to change the line number to be set by the predetermined line number setting circuit described in the first and second exemplary embodiments. Further, providing a plurality of BPFs is useful to generate a plurality of sets of overall line integral evaluation value and predetermined line integral evaluation value for each frequency. Further, a method using an integration filter is employable to realize processing reflecting the expression "addition" (i.e., instead of the expression "integration") described in the third and fourth exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-288113 filed Dec. 24, 2010, which is hereby incorporated by reference herein in its entirety.

What is claimed is:

1. A focus adjusting apparatus for an imaging system that includes an image-capturing unit configured to capture an image of an object via an optical system including a focus lens, the focus adjusting apparatus comprising:
  a generation unit configured to extract a specific frequency component from an image capturing signal generated by the image-capturing unit along each horizontal scanning line to generate a focus signal;
  an area setting unit configured to set a focus signal extraction area with reference to the image capturing signal;
  a peak holding unit configured to extract a line peak value by peak-holding the focus signal along each horizontal scanning line in the area set by the area setting unit;
  a first evaluation value generation unit configured to generate an integral evaluation value by integrating line peak values obtained along a predetermined number of horizontal scanning lines of all the horizontal scanning lines in the area set by the area setting unit, the predetermined number of horizontal scanning lines being not equal to a number of all the horizontal scanning lines;
  a point light source identification unit configured to identify the presence of a point light source object in the area;
  a second evaluation value generation unit configured to generate an integral evaluation value by integrating line peak values of all the horizontal scanning lines in the area set by the area setting unit,
  a control unit configured to perform a focus adjustment that includes driving the focus lens based on an AF evaluation value derived from the integral evaluation value generated by the first evaluation value generation unit if the point light source identification unit identifies the presence of the point light source object in the area, and to perform a focus adjustment that includes driving the focus lens based on an AF evaluation value derived from the integral evaluation value generated by the second evaluation value generation unit if the point light source identification unit has not identified the presence of any point light source object in the area.

2. The focus adjusting apparatus according to claim 1, further comprising:
a switching unit configured to select the first evaluation value generation unit or the second evaluation value generation unit according to an output result of the point light source identification unit.

3. The focus adjusting apparatus according to claim 1, wherein
the first evaluation value generation unit is configured to generate the integral evaluation value by integrating the line peak values of the predetermined number of horizontal scanning lines in descending order of magnitude.

4. The focus adjusting apparatus according to claim 1, further comprising:
a line number setting unit configured to set the predetermined number of horizontal scanning lines for the first evaluation value generation unit that integrates the line peak values.

5. A focus adjusting apparatus for an imaging system that includes an image-capturing unit configured to capture an image of an object via an optical system including a focus lens, the focus adjusting apparatus comprising:
a generation unit configured to extract a specific frequency component from an image capturing signal generated by the image-capturing unit along each horizontal scanning line to generate a focus signal;
an area setting unit configured to set a focus signal extraction area with reference to the image capturing signal;
a peak holding unit configured to extract a line peak value by peak-holding the focus signal along each horizontal scanning line in the area set by the area setting unit;
a first evaluation value generation unit configured to generate an integral evaluation value by integrating line peak values obtained along a predetermined number of horizontal scanning lines of all the horizontal scanning lines in the area set by the area setting unit, the predetermined number of horizontal scanning lines being not equal to a number of all the horizontal scanning lines;
a second evaluation value generation unit configured to generate an integral evaluation value by integrating line peak values obtained along all the horizontal scanning lines in the area set by the area setting unit;
a point light source identification unit configured to identify the presence of a point light source object in the area; and
a control unit configured to perform a focus adjustment that includes driving the focus lens based on an AF evaluation value that prioritizes the integral evaluation value generated by the first evaluation value generation unit if the point light source identification unit identifies the presence of the point light source object in the area, and perform a focus adjustment that includes driving the focus lens based on an AF evaluation value that prioritizes the integral evaluation value generated by the second evaluation value generation unit if the point light source identification unit cannot identify the presence of any point light source object in the area.

6. The focus adjusting apparatus according to claim 5, further comprising:
a switching unit configured to select the AF evaluation value to be used by the control unit for a focus adjustment control, from the two types of AF evaluation values, according to an output result of the point light source identification unit.

7. A method for controlling a focus adjusting apparatus for an imaging system that includes an image-capturing unit configured to capture an image of an object via an optical system including a focus lens, the method comprising:
a generation step of extracting a specific frequency component from an image capturing signal generated by the image-capturing unit along each horizontal scanning line to generate a focus signal;
an area setting step of setting a focus signal extraction area with reference to the image capturing signal;
a peak holding step of extracting a line peak value by peak-holding the focus signal along each horizontal scanning line in the area set by the area setting step;
a point light source identification step of identifying the presence of a point light source object in the area;
a first evaluation value generation step of generating an integral evaluation value by integrating line peak values obtained along a predetermined number of horizontal scanning lines of all the horizontal scanning lines in the area set by the area setting step, the predetermined number of horizontal scanning lines being not equal to a number of all the horizontal scanning lines;
a second evaluation value generation step of generating an integral evaluation value by integrating line peak values of all the horizontal scanning lines in the area set by the area setting step; and
a control step of performing focus adjustment that includes driving the focus lens based on an AF evaluation value derived from the integral evaluation value generated by the first evaluation value generation step if the point light source identification step identifies the presence of the point light source object in the area, and performing focus adjustment that includes driving the focus lens based on an AF evaluation value derived from the integral evaluation value generated by the second evaluation value generation step if the point light source identification step has not identified the presence of any point light source object in the area.

* * * * *